(12) United States Patent
Sun et al.

(10) Patent No.: US 12,232,219 B2
(45) Date of Patent: Feb. 18, 2025

(54) SCRAMBLING IDENTIFIERS FOR WIRELESS COMMUNICATION SYSTEMS

(71) Applicant: Virewirx, Inc., San Diego, CA (US)

(72) Inventors: Wanlu Sun, San Diego, CA (US); Jing Jiang, San Diego, CA (US); Tamer Adel Kadous, San Diego, CA (US); Michael J. Roe, San Diego, CA (US); Peter John Black, La Jolla, CA (US)

(73) Assignee: Virewirx, Inc., San Diego, CA (US)

( * ) Notice: Subject to any disclaimer, the term of this patent is extended or adjusted under 35 U.S.C. 154(b) by 261 days.

(21) Appl. No.: 17/663,175

(22) Filed: May 12, 2022

(65) Prior Publication Data

US 2022/0369101 A1   Nov. 17, 2022

Related U.S. Application Data

(60) Provisional application No. 63/188,672, filed on May 14, 2021.

(51) Int. Cl.
| | |
|---|---|
| *H04W 8/26* | (2009.01) |
| *H04L 25/02* | (2006.01) |
| *H04W 4/08* | (2009.01) |
| *H04W 72/23* | (2023.01) |
| *H04B 7/0413* | (2017.01) |

(52) U.S. Cl.
CPC ............ *H04W 8/26* (2013.01); *H04L 25/0204* (2013.01); *H04W 4/08* (2013.01); *H04W 72/23* (2023.01); *H04B 7/0413* (2013.01)

(58) Field of Classification Search
CPC ......... H04W 8/26; H04W 4/08; H04W 72/23; H04W 12/76; H04L 25/0204; H04L 25/022; H04L 25/03866; H04B 7/0413; H04J 2013/165; H04J 11/0079; H04J 13/16

See application file for complete search history.

(56) References Cited

U.S. PATENT DOCUMENTS

| | | | |
|---|---|---|---|
| 5,469,115 A | 11/1995 | Peterzell | |
| 5,617,060 A | 4/1997 | Wilson | |

(Continued)

FOREIGN PATENT DOCUMENTS

| | | | | |
|---|---|---|---|---|
| KR | 10-2019-0017179 | | 2/2019 | |
| WO | WO-2020098662 A1 | * | 5/2020 | ......... H04L 25/0228 |
| WO | WO 2020/136416 | | 7/2020 | |

OTHER PUBLICATIONS

"Physical channels and modulation", Technical Specification, 3GPP TS 38.211 version 15.2.0, Release 15, Jul. 2018, in 98 pages.

(Continued)

*Primary Examiner* — Siu M Lee

(74) *Attorney, Agent, or Firm* — Knobbe, Martens, Olson & Bear, LLP

(57) ABSTRACT

Aspects of this disclosure relate to assigning scrambling identifiers to user equipments. A first scrambling identifier can be assigned to each user equipment of a group, such that the first scrambling identifier is the same for each of the user equipments of the group. A second scrambling identifier can be assigned to each of the user equipments of the group, such that the second scrambling identifier is different for each of the user equipments of the group. A selected scrambling identifier can be used to generate a reference signal sequence.

21 Claims, 14 Drawing Sheets

(56) References Cited

U.S. PATENT DOCUMENTS

| | | |
|---|---|---|
| 5,757,858 A | 5/1998 | Black |
| 5,870,431 A | 2/1999 | Easton |
| 6,006,108 A | 12/1999 | Black |
| 6,107,878 A | 8/2000 | Black |
| 6,134,440 A | 10/2000 | Black |
| 6,147,964 A | 11/2000 | Black |
| 6,181,201 B1 | 1/2001 | Black |
| 6,205,129 B1 | 3/2001 | Esteves |
| 6,208,873 B1 | 3/2001 | Black |
| 6,246,885 B1 | 6/2001 | Black |
| 6,285,861 B1 | 9/2001 | Bonaccorso |
| 6,363,102 B1 | 3/2002 | Ling |
| 6,397,070 B1 | 5/2002 | Black |
| 6,426,971 B1 | 7/2002 | Wu |
| 6,434,376 B1 | 8/2002 | Black |
| 6,449,490 B1 | 9/2002 | Chaponniere |
| 6,466,558 B1 | 10/2002 | Ling |
| 6,560,211 B2 | 5/2003 | Esteves |
| 6,574,211 B2 | 6/2003 | Padovani |
| 6,594,501 B2 | 7/2003 | Black |
| 6,633,552 B1 | 10/2003 | Ling |
| 6,636,568 B2 | 10/2003 | Kadous |
| 6,661,833 B1 | 12/2003 | Black |
| 6,678,257 B1 | 1/2004 | Vijayan |
| 6,680,925 B2 | 1/2004 | Wu |
| 6,680,968 B2 | 1/2004 | Black |
| 6,687,510 B2 | 2/2004 | Esteves |
| 6,693,920 B2 | 2/2004 | Montojo |
| 6,694,469 B1 | 2/2004 | Jalali |
| 6,700,880 B2 | 3/2004 | Ling |
| 6,714,526 B2 | 3/2004 | Wei |
| 6,725,028 B2 | 4/2004 | Bonaccorso |
| 6,738,608 B2 | 5/2004 | Black |
| 6,748,201 B2 | 6/2004 | Black |
| 6,757,520 B2 | 6/2004 | Attar |
| 6,798,736 B1 | 9/2004 | Black |
| 6,801,580 B2 | 10/2004 | Kadous |
| 6,813,478 B2 | 11/2004 | Glazko |
| 6,873,606 B2 | 3/2005 | Agrawal |
| 6,894,994 B1 | 5/2005 | Grob |
| 6,917,821 B2 | 7/2005 | Kadous |
| 6,920,504 B2 | 7/2005 | Bender |
| 6,928,062 B2 | 8/2005 | Krishnan |
| 6,973,579 B2 | 12/2005 | Dick et al. |
| 6,985,516 B1 | 1/2006 | Easton |
| 6,987,778 B2 | 1/2006 | Sindhushayana |
| 7,010,073 B2 | 3/2006 | Black |
| 7,012,883 B2 | 3/2006 | Jalali |
| 7,020,073 B2 | 3/2006 | Kadous |
| 7,020,225 B2 | 3/2006 | Sindhushayana |
| 7,039,001 B2 | 5/2006 | Krishnan |
| 7,042,857 B2 | 5/2006 | Krishnan |
| 7,051,268 B1 | 5/2006 | Sindhushayana |
| 7,068,707 B2 | 6/2006 | Bender |
| 7,069,037 B2 | 6/2006 | Lott |
| 7,072,628 B2 | 7/2006 | Agashe |
| 7,079,550 B2 | 7/2006 | Padovani |
| 7,088,701 B1 | 8/2006 | Attar |
| 7,088,957 B2 | 8/2006 | Ling |
| 7,095,790 B2 | 8/2006 | Krishnan |
| 7,106,782 B2 | 9/2006 | Howard |
| 7,123,922 B2 | 10/2006 | Chaponniere |
| 7,127,654 B2 | 10/2006 | Jalali |
| 7,130,282 B2 | 10/2006 | Black |
| 7,133,437 B2 | 11/2006 | Black |
| 7,145,940 B2 | 12/2006 | Gore |
| 7,149,264 B2 | 12/2006 | Black |
| 7,155,246 B2 | 12/2006 | Bhushan |
| 7,167,684 B2 | 1/2007 | Kadous |
| 7,177,351 B2 | 2/2007 | Kadous |
| 7,177,648 B2 | 2/2007 | Attar |
| 7,184,426 B2 | 2/2007 | Padovani |
| 7,184,713 B2 | 2/2007 | Kadous |
| 7,194,041 B2 | 3/2007 | Kadous |
| 7,206,580 B2 | 4/2007 | Black |
| 7,209,517 B2 | 4/2007 | Sindhushayana |
| 7,228,148 B2 | 6/2007 | Esteves |
| 7,236,535 B2 | 6/2007 | Subramaniam |
| 7,239,622 B2 | 7/2007 | Black |
| 7,239,847 B2 | 7/2007 | Attar |
| 7,251,229 B2 | 7/2007 | Montojo |
| 7,266,156 B2 | 9/2007 | Montojo |
| 7,289,473 B1 | 10/2007 | Padovani |
| 7,295,857 B2 | 11/2007 | Joshi |
| 7,315,531 B2 | 1/2008 | Black |
| 7,369,549 B2 | 5/2008 | Wu |
| 7,376,209 B2 | 5/2008 | Namgoong |
| 7,382,744 B2 | 6/2008 | Bhushan |
| 7,411,930 B2 | 8/2008 | Montojo |
| 7,418,046 B2 | 8/2008 | Gore |
| 7,428,269 B2 | 9/2008 | Sampath |
| 7,450,943 B2 | 11/2008 | Black |
| 7,457,639 B2 | 11/2008 | Subramaniam |
| 7,463,576 B2 | 12/2008 | Krishnan |
| 7,477,693 B2 | 1/2009 | Subramaniam |
| 7,499,427 B2 | 3/2009 | Padovani |
| 7,508,748 B2 | 3/2009 | Kadous |
| 7,525,909 B2 | 4/2009 | Fan |
| 7,564,775 B2 | 7/2009 | Jayaraman |
| 7,564,794 B2 | 7/2009 | Montojo |
| 7,564,818 B2 | 7/2009 | Black |
| 7,567,621 B2 | 7/2009 | Sampath |
| 7,580,709 B2 | 8/2009 | Black |
| 7,596,090 B2 | 9/2009 | Black |
| 7,606,326 B2 | 10/2009 | Krishnan |
| 7,609,773 B2 | 10/2009 | Bhushan |
| 7,613,978 B2 | 11/2009 | Jalali |
| 7,620,005 B2 | 11/2009 | Wei |
| 7,646,802 B2 | 1/2010 | Black |
| 7,668,125 B2 | 2/2010 | Kadous |
| 7,672,383 B2 | 3/2010 | Namgoong |
| 7,675,886 B2 | 3/2010 | Agrawal |
| 7,693,213 B2 | 4/2010 | Sindhushayana |
| 7,725,799 B2 | 5/2010 | Walker |
| 7,729,714 B2 | 6/2010 | Black |
| 7,742,447 B2 | 6/2010 | Joshi |
| 7,796,563 B2 | 9/2010 | Wu |
| 7,817,677 B2 | 10/2010 | Black |
| 7,817,760 B2 | 10/2010 | Black |
| 7,826,441 B2 | 11/2010 | Black |
| 7,830,900 B2 | 11/2010 | Black |
| 7,835,695 B2 | 11/2010 | Ling |
| 7,848,282 B2 | 12/2010 | Padovani |
| 7,848,283 B2 | 12/2010 | Padovani |
| 7,848,284 B2 | 12/2010 | Padovani |
| 7,848,285 B2 | 12/2010 | Padovani |
| 7,848,298 B2 | 12/2010 | Attar |
| 7,869,387 B2 | 1/2011 | Black |
| 7,876,265 B2 | 1/2011 | Black |
| 7,890,144 B2 | 2/2011 | Subramaniam |
| 7,893,873 B2 | 2/2011 | Black |
| 7,903,615 B2 | 3/2011 | Gorokhov |
| 7,924,753 B2 | 4/2011 | Attar |
| 7,940,663 B2 | 5/2011 | Kadous |
| 7,948,959 B2 | 5/2011 | Wang |
| 7,953,062 B2 | 5/2011 | Sindhushayana |
| 7,961,592 B2 | 6/2011 | Black |
| 7,974,359 B2 | 7/2011 | Gorokhov |
| 7,995,531 B2 | 8/2011 | Padovani |
| 7,995,684 B2 | 8/2011 | Montojo |
| 8,005,042 B2 | 8/2011 | Padovani |
| 8,009,625 B2 | 8/2011 | Padovani |
| 8,010,113 B2 | 8/2011 | Black |
| 8,014,331 B2 | 9/2011 | Sarkar |
| 8,040,942 B2 | 10/2011 | Bhushan |
| 8,042,086 B2 | 10/2011 | Tseng |
| 8,050,198 B2 | 11/2011 | Bhushan |
| 8,073,068 B2 | 12/2011 | Kim |
| 8,077,654 B2 | 12/2011 | Sutivong |
| 8,077,655 B2 | 12/2011 | Padovani |
| 8,077,691 B2 | 12/2011 | Kadous |
| 8,085,678 B2 | 12/2011 | Spindola |
| 8,089,924 B2 | 1/2012 | Padovani |
| 8,094,623 B2 | 1/2012 | Attar |

(56) References Cited

U.S. PATENT DOCUMENTS

| | | |
|---|---|---|
| 8,094,740 B2 | 1/2012 | Bhushan |
| 8,098,635 B2 | 1/2012 | Montojo |
| 8,102,872 B2 | 1/2012 | Spindola |
| 8,107,517 B2 | 1/2012 | Naguib |
| 8,111,663 B2 | 2/2012 | Black |
| 8,116,283 B2 | 2/2012 | Black |
| 8,126,072 B2 | 2/2012 | Namgoong |
| 8,139,672 B2 | 3/2012 | Gore |
| 8,160,596 B2 | 4/2012 | Black |
| 8,165,619 B2 | 4/2012 | Attar |
| 8,175,594 B2 | 5/2012 | Attar |
| 8,189,540 B2 | 5/2012 | Padovani |
| 8,203,961 B2 | 6/2012 | Yavuz |
| 8,204,530 B2 | 6/2012 | Gorokhov |
| 8,213,390 B2 | 7/2012 | Black |
| 8,218,573 B2 | 7/2012 | Bhushan |
| 8,229,423 B2 | 7/2012 | Sarkar |
| 8,250,428 B2 | 8/2012 | Sun |
| 8,306,096 B2 | 11/2012 | Sampath |
| 8,311,027 B2 | 11/2012 | Padovani |
| 8,331,310 B2 | 12/2012 | Wang |
| 8,331,377 B2 | 12/2012 | Attar |
| 8,331,385 B2 | 12/2012 | Black |
| 8,331,892 B2 | 12/2012 | Kadous |
| 8,351,372 B2 | 1/2013 | Padovani |
| 8,351,456 B2 | 1/2013 | Kadous |
| 8,363,697 B2 | 1/2013 | Grob |
| 8,375,261 B2 | 2/2013 | Shi |
| 8,385,433 B2 | 2/2013 | Wang |
| 8,385,465 B2 | 2/2013 | Kadous |
| 8,385,923 B2 | 2/2013 | Attar |
| 8,391,196 B2 | 3/2013 | Gorokhov |
| 8,391,337 B2 | 3/2013 | Black |
| 8,391,413 B2 | 3/2013 | Mantravadi |
| 8,406,774 B2 | 3/2013 | Yavuz |
| 8,411,594 B2 | 4/2013 | Black |
| 8,412,227 B2 | 4/2013 | Edge |
| 8,416,756 B2 | 4/2013 | Bhushan |
| 8,443,255 B2 | 5/2013 | Jiang |
| 8,451,740 B2 | 5/2013 | Sampath |
| 8,451,776 B2 | 5/2013 | Dayal |
| 8,457,152 B2 | 6/2013 | Gorokhov |
| 8,462,859 B2 | 6/2013 | Sampath |
| 8,472,322 B2 | 6/2013 | Black |
| 8,483,223 B2 | 7/2013 | Black |
| 8,493,942 B2 | 7/2013 | Luo et al. |
| 8,493,958 B2 | 7/2013 | Attar |
| 8,494,593 B2 | 7/2013 | Black |
| 8,498,192 B2 | 7/2013 | Bhushan |
| 8,514,988 B2 | 8/2013 | Wu |
| 8,576,760 B2 | 11/2013 | Gorokhov |
| 8,582,621 B2 | 11/2013 | Grob |
| 8,583,137 B2 | 11/2013 | Rezaiifar |
| 8,594,252 B2 | 11/2013 | Black |
| 8,605,729 B2 | 12/2013 | Dayal |
| 8,605,801 B2 | 12/2013 | Rezaiifar |
| 8,605,839 B2 | 12/2013 | Jiang |
| 8,611,303 B2 | 12/2013 | Rezaiifar |
| 8,611,305 B2 | 12/2013 | Black |
| 8,611,310 B2 | 12/2013 | Black |
| 8,611,325 B2 | 12/2013 | Black |
| 8,619,717 B2 | 12/2013 | Agrawal |
| 8,619,835 B2 | 12/2013 | Grob |
| 8,630,602 B2 | 1/2014 | Attar |
| 8,634,435 B2 | 1/2014 | Kadous |
| 8,634,438 B2 | 1/2014 | Nanda |
| 8,638,758 B2 | 1/2014 | Black |
| 8,639,190 B2 | 1/2014 | Gore |
| 8,640,012 B2 | 1/2014 | Ling |
| 8,654,705 B2 | 2/2014 | Wang |
| 8,654,715 B2 | 2/2014 | Wang |
| 8,655,400 B2 | 2/2014 | Kadous |
| 8,676,209 B2 | 3/2014 | Gorokhov |
| 8,700,083 B2 | 4/2014 | Yavuz |
| 8,712,461 B2 | 4/2014 | Yavuz |
| 8,724,545 B2 | 5/2014 | Dayal |
| 8,724,555 B2 | 5/2014 | Krishnan |
| 8,737,470 B2 | 5/2014 | Walker |
| 8,737,538 B2 | 5/2014 | Grob |
| 8,737,911 B2 | 5/2014 | Black |
| 8,743,909 B2 | 6/2014 | Black |
| 8,744,018 B2 | 6/2014 | Chen |
| 8,760,994 B2 | 6/2014 | Wang |
| 8,767,885 B2 | 7/2014 | Sampath |
| 8,773,308 B2 | 7/2014 | Black |
| 8,824,979 B2 | 9/2014 | Yavuz |
| 8,825,860 B2 | 9/2014 | Linsky |
| 8,830,934 B2 | 9/2014 | Banister |
| 8,839,079 B2 | 9/2014 | Chen |
| 8,842,693 B2 | 9/2014 | Agrawal |
| 8,848,607 B2 | 9/2014 | Wang |
| 8,854,944 B2 | 10/2014 | Jou |
| 8,855,001 B2 | 10/2014 | Gorokhov |
| 8,867,456 B2 | 10/2014 | Yavuz |
| 8,868,118 B2 | 10/2014 | Rezaiifar |
| 8,873,534 B2 | 10/2014 | Sindhushayana |
| 8,874,998 B2 | 10/2014 | Walker |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,897,181 B2 | 11/2014 | Wang |
| 8,897,188 B2 | 11/2014 | Black |
| 8,897,220 B2 | 11/2014 | Kadous |
| 8,903,021 B2 | 12/2014 | Mantravadi |
| 8,908,496 B2 | 12/2014 | Kadous |
| 8,909,279 B2 | 12/2014 | Yavuz |
| 8,923,109 B2 | 12/2014 | Wang |
| 8,923,125 B2 | 12/2014 | Lott |
| 8,923,208 B2 | 12/2014 | Dayal |
| 8,929,908 B2 | 1/2015 | Agrawal |
| 8,948,095 B2 | 2/2015 | Black |
| 8,954,063 B2 | 2/2015 | Sarkar |
| 8,971,461 B2 | 3/2015 | Sampath |
| 8,971,823 B2 | 3/2015 | Gore |
| 8,971,884 B2 | 3/2015 | Ahluwalia |
| 8,982,832 B2 | 3/2015 | Ling |
| 8,983,480 B2 | 3/2015 | Rezaiifar |
| 8,995,417 B2 | 3/2015 | Jou |
| 9,001,735 B2 | 4/2015 | Padovani |
| 9,014,152 B2 | 4/2015 | Jou |
| 9,020,009 B2 | 4/2015 | Barriac |
| 9,036,538 B2 | 5/2015 | Palanki |
| 9,055,545 B2 | 6/2015 | Black |
| 9,059,785 B2 | 6/2015 | Fertonani |
| 9,066,306 B2 | 6/2015 | Yavuz |
| 9,071,344 B2 | 6/2015 | Smee |
| 9,072,102 B2 | 6/2015 | Yavuz |
| 9,078,269 B2 | 7/2015 | Yavuz |
| 9,088,389 B2 | 7/2015 | Gorokhov |
| 9,106,287 B2 | 8/2015 | Wang |
| 9,113,488 B2 | 8/2015 | Oguz |
| 9,118,387 B2 | 8/2015 | Padovani |
| 9,119,026 B2 | 8/2015 | Black |
| 9,119,217 B2 | 8/2015 | Black |
| 9,124,344 B2 | 9/2015 | Padovani |
| 9,131,420 B2 | 9/2015 | Rezaiifar |
| 9,136,974 B2 | 9/2015 | Gorokhov |
| 9,137,806 B2 | 9/2015 | Yavuz |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |

(56) References Cited

U.S. PATENT DOCUMENTS

| | | |
|---|---|---|
| 9,198,053 B2 | 11/2015 | Edge |
| 9,204,437 B2 | 12/2015 | Smee |
| 9,226,173 B2 | 12/2015 | Sadek |
| 9,246,560 B2 | 1/2016 | Sampath |
| 9,253,658 B2 | 2/2016 | Sadek |
| 9,277,564 B2 | 3/2016 | Wang |
| 9,282,462 B2 | 3/2016 | Dayal |
| 9,288,814 B2 | 3/2016 | Yavuz |
| 9,307,544 B2 | 4/2016 | Gore |
| 9,344,973 B2 | 5/2016 | Yavuz |
| 9,363,764 B2 | 6/2016 | Black et al. |
| 9,374,791 B2 | 6/2016 | Yavuz |
| 9,398,602 B2 | 7/2016 | Kadous |
| 9,408,165 B2 | 8/2016 | Jou |
| 9,408,220 B2 | 8/2016 | Gore |
| 9,419,751 B2 | 8/2016 | Sindhushayana |
| 9,451,480 B2 | 9/2016 | Huang |
| 9,461,736 B2 | 10/2016 | Bhushan |
| 9,474,075 B2 | 10/2016 | Yavuz |
| 9,491,722 B2 | 11/2016 | Yavuz |
| 9,525,477 B1 | 12/2016 | Wu |
| 9,578,649 B2 | 2/2017 | Dayal |
| 9,585,150 B2 | 2/2017 | Marsh |
| 9,585,156 B2 | 2/2017 | Bhattad |
| 9,660,776 B2 | 5/2017 | Kadous |
| 9,673,948 B2 | 6/2017 | Jiang |
| 9,730,227 B2 | 8/2017 | Marsh |
| 9,750,014 B2 | 8/2017 | Sadek |
| 9,781,693 B2 | 10/2017 | Ji |
| 9,788,361 B2 | 10/2017 | Valliappan |
| 9,814,040 B2 | 11/2017 | Bhushan |
| 9,814,058 B2 | 11/2017 | Jiang |
| 9,825,798 B1 | 11/2017 | Sun |
| 9,832,785 B2 | 11/2017 | Kadous |
| 9,847,862 B2 | 12/2017 | Soriaga |
| 9,860,033 B2 | 1/2018 | Kadous |
| 9,867,194 B2 | 1/2018 | Kadous |
| 9,893,800 B2 | 2/2018 | Wu |
| 9,894,701 B2 | 2/2018 | Ang |
| 9,900,856 B2 | 2/2018 | Wu |
| 9,924,368 B2 | 3/2018 | Valliappan |
| 9,929,812 B2 | 3/2018 | Manolakos |
| 9,936,400 B2 | 4/2018 | Lee |
| 9,936,469 B2 | 4/2018 | Ji |
| 9,936,498 B2 | 4/2018 | Azarian Yazdi |
| 9,936,519 B2 | 4/2018 | Mukkavilli |
| 9,954,668 B2 | 4/2018 | Lee |
| 9,955,365 B2 | 4/2018 | Lin |
| 9,955,476 B2 | 4/2018 | Black |
| 9,955,497 B2 | 4/2018 | Jiang |
| 9,967,070 B2 | 5/2018 | Jiang |
| 9,974,093 B2 | 5/2018 | Lin |
| 9,979,450 B2 | 5/2018 | Jiang |
| 9,980,271 B2 | 5/2018 | Soriaga |
| 9,983,290 B2 | 5/2018 | Pajona et al. |
| 9,985,802 B2 | 5/2018 | Jiang |
| 9,991,986 B2 | 6/2018 | Sindhushayana |
| 9,992,790 B2 | 6/2018 | Jiang |
| 10,009,160 B2 | 6/2018 | Jiang |
| 10,009,912 B2 | 6/2018 | Abraham |
| 10,027,462 B2 | 7/2018 | Jiang |
| 10,028,240 B2 | 7/2018 | Ji |
| 10,033,577 B2 | 7/2018 | Soriaga |
| 10,033,578 B2 | 7/2018 | Soriaga |
| 10,038,528 B2 | 7/2018 | Jiang |
| 10,038,544 B2 | 7/2018 | Zeng |
| 10,044,438 B2 | 8/2018 | Kadous |
| 10,044,459 B2 | 8/2018 | Chendamarai Kannan |
| 10,057,019 B2 | 8/2018 | Jiang |
| 10,075,187 B2 | 9/2018 | Jiang |
| 10,075,194 B2 | 9/2018 | Lin |
| 10,075,271 B2 | 9/2018 | Soriaga |
| 10,075,313 B2 | 9/2018 | Black |
| 10,075,970 B2 | 9/2018 | Jiang |
| 10,080,214 B2 | 9/2018 | Lin |
| 10,084,563 B2 | 9/2018 | Park |
| 10,084,578 B2 | 9/2018 | Azarian Yazdi |
| 10,091,789 B2 | 10/2018 | Valliappan |
| 10,091,810 B2 | 10/2018 | Zeng |
| 10,097,260 B2 | 10/2018 | Hosseini |
| 10,098,059 B2 | 10/2018 | Ly |
| 10,104,616 B2 | 10/2018 | Ang |
| 10,104,624 B2 | 10/2018 | Sundararajan |
| 10,122,559 B2 | 11/2018 | Manolakos |
| 10,123,219 B2 | 11/2018 | Bhushan |
| 10,135,591 B2 | 11/2018 | Chen |
| 10,141,991 B2 | 11/2018 | Jiang |
| 10,142,060 B2 | 11/2018 | Xu |
| 10,159,097 B2 | 12/2018 | Ji |
| 10,177,826 B2 | 1/2019 | Manolakos |
| 10,178,649 B2 | 1/2019 | Liu |
| 10,182,404 B2 | 1/2019 | Prakash |
| 10,182,426 B2 | 1/2019 | Ji |
| 10,200,140 B2 | 2/2019 | Li |
| 10,200,994 B2 | 2/2019 | Park |
| 10,201,014 B2 | 2/2019 | Kadous |
| 10,205,618 B2 | 2/2019 | Wang |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,224,966 B2 | 3/2019 | Li |
| 10,225,065 B2 | 3/2019 | Ang |
| 10,225,818 B2 | 3/2019 | Liu |
| 10,230,502 B2 | 3/2019 | Ji |
| 10,231,259 B2 | 3/2019 | Lin |
| 10,237,030 B2 | 3/2019 | Azarian Yazdi |
| 10,237,037 B2 | 3/2019 | Jiang |
| 10,237,889 B2 | 3/2019 | Sundararajan |
| 10,257,844 B2 | 4/2019 | Yang |
| 10,257,848 B2 | 4/2019 | Sun |
| 10,257,851 B2 | 4/2019 | Patel |
| 10,263,745 B2 | 4/2019 | Soriaga |
| 10,263,754 B2 | 4/2019 | Lin |
| 10,263,817 B1 | 4/2019 | Roe et al. |
| 10,264,541 B2 | 4/2019 | Patel |
| 10,270,562 B2 | 4/2019 | Yang |
| 10,278,177 B2 | 4/2019 | Sadek |
| 10,285,189 B2 | 5/2019 | Sundararajan |
| 10,291,372 B2 | 5/2019 | Azarian Yazdi |
| 10,291,379 B2 | 5/2019 | Kadous |
| 10,292,093 B2 | 5/2019 | Chendamarai Kannan |
| 10,298,289 B2 | 5/2019 | Yerramalli |
| 10,298,434 B2 | 5/2019 | Manolakos |
| 10,299,284 B2 | 5/2019 | Sadek |
| 10,313,160 B2 | 6/2019 | Jiang |
| 10,313,851 B2 | 6/2019 | Blasco Serrano et al. |
| 10,314,065 B2 | 6/2019 | Yang |
| 10,320,428 B2 | 6/2019 | Sarkis |
| 10,327,241 B2 | 6/2019 | Kadous |
| 10,327,261 B2 | 6/2019 | Naghshvar |
| 10,333,752 B2 | 6/2019 | Jiang |
| 10,334,546 B2 | 6/2019 | Chendamarai Kannan |
| 10,334,594 B2 | 6/2019 | Sundararajan |
| 10,341,976 B2 | 7/2019 | Ji |
| 10,342,012 B2 | 7/2019 | Mukkavilli |
| 10,348,329 B2 | 7/2019 | Soriaga |
| 10,349,404 B2 | 7/2019 | Chendamarai Kannan |
| 10,355,803 B2 | 7/2019 | Manolakos |
| 10,356,800 B2 | 7/2019 | Manolakos |
| 10,356,811 B2 | 7/2019 | Luo |
| 10,356,816 B2 | 7/2019 | Valliappan |
| 10,362,574 B2 | 7/2019 | Chendamarai Kannan |
| 10,367,621 B2 | 7/2019 | Jiang |
| 10,368,301 B2 | 7/2019 | Chendamarai Kannan |
| 10,368,305 B2 | 7/2019 | Radulescu |
| 10,368,348 B2 | 7/2019 | Chendamarai Kannan |
| 10,368,372 B2 | 7/2019 | Chendamarai Kannan |
| 10,374,777 B2 | 8/2019 | Kadous |
| 10,375,711 B2 | 8/2019 | Sadek |
| 10,375,718 B2 | 8/2019 | Manolakos |
| 10,382,177 B2 | 8/2019 | Jiang |
| 10,382,233 B2 | 8/2019 | Abdelghaffar |
| 10,389,503 B2 | 8/2019 | Soriaga |

(56) References Cited

U.S. PATENT DOCUMENTS

| | | |
|---|---|---|
| 10,389,504 B2 | 8/2019 | Soriaga |
| 10,390,361 B2 | 8/2019 | Mukkavilli |
| 10,390,362 B2 | 8/2019 | Gupta |
| 10,396,962 B2 | 8/2019 | Li |
| 10,404,332 B2 | 9/2019 | Ji |
| 10,404,340 B2 | 9/2019 | Manolakos |
| 10,404,434 B2 | 9/2019 | Kannan |
| 10,404,509 B2 | 9/2019 | Sun |
| 10,405,228 B2 | 9/2019 | Liu |
| 10,405,242 B2 | 9/2019 | Kadous |
| 10,405,262 B2 | 9/2019 | Chendamarai Kannan |
| 10,405,278 B2 | 9/2019 | Ang |
| 10,405,335 B2 | 9/2019 | Barghi |
| 10,411,782 B2 | 9/2019 | Namgoong |
| 10,411,795 B2 | 9/2019 | Liu |
| 10,412,632 B2 | 9/2019 | Li |
| 10,412,719 B2 | 9/2019 | Chen |
| 10,412,733 B2 | 9/2019 | Sun |
| 10,419,171 B2 | 9/2019 | Park |
| 10,419,244 B2 | 9/2019 | Jiang |
| 10,419,749 B2 | 9/2019 | Roe et al. |
| 10,425,824 B2 | 9/2019 | Li |
| 10,425,923 B2 | 9/2019 | Wang |
| 10,425,945 B2 | 9/2019 | Sun |
| 10,432,357 B2 | 10/2019 | Yang |
| 10,433,179 B2 | 10/2019 | Zhang |
| 10,440,657 B2 | 10/2019 | Sundararajan |
| 10,440,726 B2 | 10/2019 | Jiang |
| 10,440,729 B2 | 10/2019 | Li |
| 10,447,426 B2 | 10/2019 | Sundararajan |
| 10,447,447 B2 | 10/2019 | Namgoong |
| 10,448,296 B2 | 10/2019 | Radulescu |
| 10,448,380 B2 | 10/2019 | Islam |
| 10,454,541 B2 | 10/2019 | Sundararajan |
| 10,454,569 B2 | 10/2019 | Wu |
| 10,455,457 B2 | 10/2019 | Sadek |
| 10,461,797 B2 | 10/2019 | Liu |
| 10,461,889 B2 | 10/2019 | Park |
| 10,461,891 B2 | 10/2019 | Park |
| 10,461,976 B2 | 10/2019 | Chen |
| 10,469,203 B2 | 11/2019 | Sankar |
| 10,476,627 B2 | 11/2019 | Bhushan |
| 10,476,641 B2 | 11/2019 | Yang |
| 10,476,650 B2 | 11/2019 | Yang |
| 10,476,781 B2 | 11/2019 | Luo |
| 10,477,437 B2 | 11/2019 | Zhang |
| 10,477,466 B2 | 11/2019 | Ly |
| 10,477,526 B2 | 11/2019 | Chendamarai Kannan |
| 10,484,054 B2 | 11/2019 | Sundararajan |
| 10,484,129 B2 | 11/2019 | Jiang |
| 10,484,135 B2 | 11/2019 | Mallik |
| 10,484,146 B2 | 11/2019 | Sun |
| 10,484,878 B2 | 11/2019 | Patel |
| 10,484,934 B2 | 11/2019 | Malik |
| 10,484,935 B2 | 11/2019 | Li |
| 10,484,954 B2 | 11/2019 | Liu |
| 10,484,959 B2 | 11/2019 | Liu |
| 10,484,972 B2 | 11/2019 | Lin |
| 10,484,992 B2 | 11/2019 | Sadek |
| 10,485,016 B2 | 11/2019 | Zeng |
| 10,492,181 B2 | 11/2019 | Jiang |
| 10,498,503 B2 | 12/2019 | Tavildar |
| 10,499,393 B2 | 12/2019 | Mukkavilli |
| 10,505,701 B2 | 12/2019 | Ang |
| 10,506,629 B2 | 12/2019 | Sun et al. |
| 10,511,093 B2 | 12/2019 | Shamblin et al. |
| 10,511,399 B2 | 12/2019 | Sun et al. |
| 10,511,987 B2 | 12/2019 | Liu et al. |
| 10,512,098 B2 | 12/2019 | Jiang |
| 10,516,618 B2 | 12/2019 | Barghi et al. |
| 10,523,300 B2 | 12/2019 | Malik et al. |
| 10,523,369 B2 | 12/2019 | Yang |
| 10,524,257 B2 | 12/2019 | Li |
| 10,524,259 B2 | 12/2019 | Azarian Yazdi |
| 10,524,278 B2 | 12/2019 | Abraham |
| 10,536,966 B2 | 1/2020 | Liu et al. |
| 10,541,780 B2 | 1/2020 | Mukkavilli |
| 10,541,791 B2 | 1/2020 | Ji |
| 10,541,851 B2 | 1/2020 | Malik et al. |
| 10,542,436 B2 | 1/2020 | Liu et al. |
| 10,542,541 B2 | 1/2020 | Valliappan et al. |
| 10,542,543 B2 | 1/2020 | Yerramalli et al. |
| 10,547,402 B2 | 1/2020 | Li |
| 10,547,415 B2 | 1/2020 | Jiang |
| 10,547,422 B2 | 1/2020 | Yoo et al. |
| 10,547,494 B2 | 1/2020 | Liu et al. |
| 10,548,020 B2 | 1/2020 | Khoshnevisan et al. |
| 10,548,131 B2 | 1/2020 | Yerramalli et al. |
| 10,548,144 B2 | 1/2020 | Soriaga |
| 10,548,153 B2 | 1/2020 | Akkarakaran et al. |
| 10,548,155 B2 | 1/2020 | Manolakos |
| 10,554,462 B2 | 2/2020 | Yang |
| 10,554,539 B2 | 2/2020 | Luo |
| 10,554,540 B2 | 2/2020 | Luo |
| 10,555,203 B2 | 2/2020 | Malik |
| 10,555,210 B2 | 2/2020 | Sun |
| 10,560,304 B2 | 2/2020 | Lei |
| 10,567,118 B2 | 2/2020 | Yang |
| 10,568,128 B2 | 2/2020 | Li |
| 10,574,565 B2 | 2/2020 | Luo |
| 10,575,185 B2 | 2/2020 | Li |
| 10,575,229 B2 | 2/2020 | Wu |
| 10,581,572 B2 | 3/2020 | Chendamarai Kannan |
| 10,581,722 B2 | 3/2020 | Luo |
| 10,582,458 B2 | 3/2020 | Sadek |
| 10,587,435 B2 | 3/2020 | Sun et al. |
| 10,587,438 B2 | 3/2020 | Roe et al. |
| 10,587,497 B2 | 3/2020 | Luo |
| 10,594,532 B2 | 3/2020 | Wang |
| 10,595,225 B2 | 3/2020 | John Wilson et al. |
| 10,595,302 B2 | 3/2020 | Mukkavilli |
| 10,595,327 B2 | 3/2020 | Sadek |
| 10,595,332 B2 | 3/2020 | Jiang |
| 10,595,342 B2 | 3/2020 | Islam |
| 10,602,515 B2 | 3/2020 | Ly |
| 10,602,543 B2 | 3/2020 | Sun |
| 10,608,785 B2 | 3/2020 | Wang |
| 10,609,660 B2 | 3/2020 | Liu |
| 10,615,825 B2 | 4/2020 | Sarkis |
| 10,616,737 B2 | 4/2020 | Liu |
| 10,616,912 B2 | 4/2020 | Chendamarai Kannan |
| 10,616,914 B2 | 4/2020 | Manolakos |
| 10,623,138 B2 | 4/2020 | Yang |
| 10,623,163 B2 | 4/2020 | Sun |
| 10,623,208 B2 | 4/2020 | Jiang |
| 10,624,079 B2 | 4/2020 | Xu |
| 10,630,450 B2 | 4/2020 | Sun |
| 10,631,323 B2 | 4/2020 | Zeng |
| 10,681,724 B2 | 6/2020 | Blasco Serrano et al. |
| 10,708,028 B2 | 7/2020 | Nam et al. |
| 10,764,573 B2 | 9/2020 | Roe et al. |
| 10,892,929 B2 | 1/2021 | Sorrentino et al. |
| 10,942,243 B2 | 3/2021 | Pajona et al. |
| 11,063,622 B2 | 7/2021 | Roe et al. |
| 11,196,449 B2 | 12/2021 | Roe et al. |
| 11,196,474 B2 | 12/2021 | Sun et al. |
| 2004/0057401 A1 | 3/2004 | Dick et al. |
| 2004/0110525 A1 | 6/2004 | Black |
| 2004/0121730 A1 | 6/2004 | Kadous |
| 2006/0119356 A1 | 6/2006 | Rabe et al. |
| 2006/0203794 A1 | 9/2006 | Sampath |
| 2007/0041457 A1 | 2/2007 | Kadous |
| 2007/0066232 A1 | 3/2007 | Black |
| 2007/0071147 A1 | 3/2007 | Sampath |
| 2007/0165738 A1 | 7/2007 | Barriac |
| 2008/0025241 A1 | 1/2008 | Bhushan |
| 2008/0032740 A1 | 2/2008 | Joshi |
| 2008/0112495 A1 | 5/2008 | Gore |
| 2009/0080499 A1 | 3/2009 | Yavuz |
| 2009/0135754 A1 | 5/2009 | Yavuz |
| 2009/0163209 A1 | 6/2009 | Black |
| 2009/0271686 A1 | 10/2009 | Jiang et al. |
| 2010/0003931 A1 | 1/2010 | Krishnan |
| 2010/0046497 A1 | 2/2010 | Jalali |

(56) References Cited

U.S. PATENT DOCUMENTS

| | | |
|---|---|---|
| 2010/0067422 A1 | 3/2010 | Kadous |
| 2010/0153488 A1 | 6/2010 | Mittal |
| 2010/0215022 A1 | 8/2010 | Black |
| 2010/0232338 A1 | 9/2010 | Krishnamoorthi |
| 2010/0251069 A1 | 9/2010 | Sun et al. |
| 2010/0303034 A1* | 12/2010 | Chen .............. H04L 25/03343 370/329 |
| 2011/0007680 A1 | 1/2011 | Kadous |
| 2011/0007688 A1 | 1/2011 | Veeravalli |
| 2011/0222423 A1 | 9/2011 | Spindola |
| 2011/0235515 A1 | 9/2011 | Dreyfus |
| 2011/0256834 A1 | 10/2011 | Dayal |
| 2011/0310858 A1 | 12/2011 | Tokgoz |
| 2012/0077532 A1 | 3/2012 | Kadous |
| 2012/0113906 A1 | 5/2012 | Kadous |
| 2012/0127870 A1 | 5/2012 | Zhao |
| 2012/0127923 A1 | 5/2012 | Zhao |
| 2012/0140798 A1 | 6/2012 | Kadous |
| 2012/0213303 A1 | 8/2012 | Kadous |
| 2014/0029705 A1 | 1/2014 | Wu |
| 2014/0038645 A1 | 2/2014 | Wu |
| 2014/0071894 A1 | 3/2014 | Kairouz |
| 2014/0079155 A1 | 3/2014 | Wang |
| 2014/0126505 A1 | 5/2014 | Chun et al. |
| 2014/0219117 A1 | 8/2014 | Meshkati |
| 2014/0219243 A1 | 8/2014 | Meshkati |
| 2014/0269616 A1 | 9/2014 | Black |
| 2014/0273884 A1 | 9/2014 | Mantravadi |
| 2015/0063150 A1 | 3/2015 | Sadek |
| 2015/0063151 A1 | 3/2015 | Sadek |
| 2015/0063323 A1 | 3/2015 | Sadek |
| 2015/0085686 A1 | 3/2015 | Chande |
| 2015/0139015 A1 | 5/2015 | Kadous |
| 2015/0163823 A1 | 6/2015 | Sadek |
| 2015/0282077 A1 | 10/2015 | Yavuz |
| 2015/0319702 A1 | 11/2015 | Patel |
| 2015/0350919 A1 | 12/2015 | Patel |
| 2016/0088625 A1 | 3/2016 | Kadous |
| 2016/0095039 A1 | 3/2016 | Valliappan |
| 2016/0095040 A1 | 3/2016 | Valliappan |
| 2016/0128045 A1 | 5/2016 | Yazdi et al. |
| 2016/0128130 A1 | 5/2016 | Sadek |
| 2016/0270046 A1 | 9/2016 | Lin et al. |
| 2016/0295557 A1 | 10/2016 | Yazdi et al. |
| 2016/0352481 A1 | 12/2016 | Jiang et al. |
| 2016/0353482 A1 | 12/2016 | Valliappan |
| 2017/0005741 A1 | 1/2017 | Wu |
| 2017/0019814 A1 | 1/2017 | Determan |
| 2017/0027017 A1 | 1/2017 | Black |
| 2017/0141798 A1 | 5/2017 | Kudekar et al. |
| 2017/0142705 A1 | 5/2017 | Chendamarai Kannan |
| 2017/0149543 A1 | 5/2017 | Ang et al. |
| 2017/0150486 A1 | 5/2017 | Ang et al. |
| 2017/0171855 A1 | 6/2017 | Sundararajan et al. |
| 2017/0171879 A1 | 6/2017 | Jiang et al. |
| 2017/0207884 A1 | 7/2017 | Jiang et al. |
| 2017/0222771 A1 | 8/2017 | Chendamarai Kannan |
| 2017/0272224 A1 | 9/2017 | Ang et al. |
| 2017/0311346 A1 | 10/2017 | Chendamarai Kannan |
| 2017/0318563 A1 | 11/2017 | Yang et al. |
| 2017/0332288 A1 | 11/2017 | Sadek |
| 2017/0338996 A1 | 11/2017 | Sankar et al. |
| 2017/0359146 A1 | 12/2017 | Yang et al. |
| 2017/0359714 A1 | 12/2017 | Gupta et al. |
| 2018/0019766 A1 | 1/2018 | Yang et al. |
| 2018/0026740 A1 | 1/2018 | Chen et al. |
| 2018/0026764 A1 | 1/2018 | Namgoong et al. |
| 2018/0035423 A1 | 2/2018 | Wang |
| 2018/0035455 A1 | 2/2018 | Xu |
| 2018/0042018 A1 | 2/2018 | Bhushan |
| 2018/0042030 A1 | 2/2018 | Xu |
| 2018/0049097 A1 | 2/2018 | Chen |
| 2018/0054348 A1 | 2/2018 | Luo |
| 2018/0054780 A1 | 2/2018 | Radulescu |
| 2018/0062810 A1 | 3/2018 | Vitthaladevuni |
| 2018/0083824 A1 | 3/2018 | Yang |
| 2018/0091373 A1 | 3/2018 | Manolakos |
| 2018/0092002 A1 | 3/2018 | Manolakos |
| 2018/0092081 A1 | 3/2018 | Chen |
| 2018/0097534 A1 | 4/2018 | Manolakos |
| 2018/0098293 A1 | 4/2018 | Jiang |
| 2018/0098307 A1 | 4/2018 | Yang |
| 2018/0098316 A1 | 4/2018 | Wang |
| 2018/0103428 A1 | 4/2018 | Jiang |
| 2018/0103485 A1 | 4/2018 | Jiang |
| 2018/0109406 A1 | 4/2018 | Wang |
| 2018/0110048 A1 | 4/2018 | Ang |
| 2018/0115973 A1 | 4/2018 | Black |
| 2018/0124753 A1 | 5/2018 | Sun |
| 2018/0124777 A1 | 5/2018 | Yerramalli |
| 2018/0124789 A1 | 5/2018 | Yerramalli |
| 2018/0132223 A1 | 5/2018 | Sankar |
| 2018/0139618 A1 | 5/2018 | Yerramalli |
| 2018/0139758 A1 | 5/2018 | Sankar |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0176922 A1 | 6/2018 | Li |
| 2018/0176946 A1 | 6/2018 | Sun |
| 2018/0191470 A1 | 7/2018 | Manolakos |
| 2018/0198560 A1 | 7/2018 | Jiang |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234880 A1 | 8/2018 | Jiang |
| 2018/0234881 A1 | 8/2018 | Hosseini |
| 2018/0234968 A1 | 8/2018 | Sun |
| 2018/0234993 A1 | 8/2018 | Hosseini |
| 2018/0241494 A1 | 8/2018 | Chendamarai Kannan |
| 2018/0242348 A1 | 8/2018 | Chendamarai Kannan |
| 2018/0249486 A1 | 8/2018 | Hosseini |
| 2018/0249496 A1 | 8/2018 | Radulescu |
| 2018/0255584 A1 | 9/2018 | Sun |
| 2018/0262311 A1 | 9/2018 | Wang |
| 2018/0262317 A1 | 9/2018 | Jiang |
| 2018/0269898 A1 | 9/2018 | Sun |
| 2018/0270022 A1 | 9/2018 | Sun |
| 2018/0270023 A1 | 9/2018 | Jiang |
| 2018/0270816 A1 | 9/2018 | Li |
| 2018/0279134 A1 | 9/2018 | Malik |
| 2018/0279292 A1 | 9/2018 | Luo |
| 2018/0279298 A1 | 9/2018 | Wang |
| 2018/0287744 A1 | 10/2018 | Sundararajan |
| 2018/0287745 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310262 A1 | 10/2018 | Ly |
| 2018/0310341 A1 | 10/2018 | Yerramalli |
| 2018/0323943 A1 | 11/2018 | Jiang |
| 2018/0324676 A1 | 11/2018 | Huang |
| 2018/0324713 A1 | 11/2018 | Yoo |
| 2018/0331693 A1 | 11/2018 | Lou |
| 2018/0343676 A1 | 11/2018 | Yerramalli |
| 2018/0352563 A1 | 12/2018 | Liu |
| 2018/0367245 A1 | 12/2018 | Soriaga |
| 2018/0367362 A1 | 12/2018 | Sun |
| 2018/0368089 A1 | 12/2018 | Yerramalli |
| 2018/0375612 A1 | 12/2018 | Sarkis |
| 2018/0375629 A1 | 12/2018 | Lee |
| 2018/0376392 A1 | 12/2018 | Wu |
| 2019/0007946 A1 | 1/2019 | Yerramalli |
| 2019/0007956 A1 | 1/2019 | Jiang |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |

(56) References Cited

U.S. PATENT DOCUMENTS

| | | |
|---|---|---|
| 2019/0020528 A1 | 1/2019 | Lei |
| 2019/0020529 A1 | 1/2019 | Lei |
| 2019/0021080 A1 | 1/2019 | Lei |
| 2019/0021097 A1 | 1/2019 | Li |
| 2019/0028119 A1 | 1/2019 | Yang |
| 2019/0028999 A1 | 1/2019 | Yerramalli |
| 2019/0029019 A1 | 1/2019 | Zhang |
| 2019/0036663 A1 | 1/2019 | Azarian Yazdi |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0044540 A1 | 2/2019 | Jiang |
| 2019/0044777 A1 | 2/2019 | Manolakos |
| 2019/0052400 A1 | 2/2019 | Soriaga |
| 2019/0053255 A1 | 2/2019 | Li |
| 2019/0053266 A1 | 2/2019 | Jiang |
| 2019/0053269 A1 | 2/2019 | Lei |
| 2019/0058553 A1 | 2/2019 | Sun |
| 2019/0059001 A1 | 2/2019 | Yerramalli |
| 2019/0059102 A1 | 2/2019 | Yerramalli |
| 2019/0068335 A1 | 2/2019 | Li |
| 2019/0068345 A1 | 2/2019 | Chen |
| 2019/0069325 A1 | 2/2019 | Yerramalli |
| 2019/0075597 A1 | 3/2019 | Yerramalli |
| 2019/0081768 A1 | 3/2019 | Zhang |
| 2019/0082333 A1 | 3/2019 | Malik |
| 2019/0089489 A1 | 3/2019 | Li |
| 2019/0090178 A1 | 3/2019 | Liu |
| 2019/0090256 A1 | 3/2019 | Liu |
| 2019/0090273 A1 | 3/2019 | Yoo |
| 2019/0098654 A1 | 3/2019 | Li |
| 2019/0098663 A1 | 3/2019 | Zhang |
| 2019/0103928 A1 | 4/2019 | Nagaraja |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0124595 A1 | 4/2019 | Lei |
| 2019/0124613 A1 | 4/2019 | Liu |
| 2019/0124630 A1 | 4/2019 | Ji |
| 2019/0124663 A1 | 4/2019 | Liu |
| 2019/0124694 A1 | 4/2019 | Chendamarai Kannan |
| 2019/0124700 A1 | 4/2019 | Ji |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0149364 A1 | 5/2019 | Sundararajan |
| 2019/0150088 A1 | 5/2019 | Sun |
| 2019/0150120 A1 | 5/2019 | Sarkis |
| 2019/0150179 A1 | 5/2019 | Soriaga |
| 2019/0150198 A1 | 5/2019 | Sun |
| 2019/0158221 A1 | 5/2019 | Sarkis |
| 2019/0158227 A1 | 5/2019 | Gupta |
| 2019/0158240 A1 | 5/2019 | Li |
| 2019/0158251 A1 | 5/2019 | Park |
| 2019/0158252 A1 | 5/2019 | Li |
| 2019/0158333 A1 | 5/2019 | Zhang |
| 2019/0159202 A1 | 5/2019 | Lee |
| 2019/0159280 A1 | 5/2019 | Chakraborty |
| 2019/0165902 A1 | 5/2019 | Li |
| 2019/0165982 A1 | 5/2019 | Gaal |
| 2019/0166589 A1 | 5/2019 | Yang |
| 2019/0166621 A1 | 5/2019 | Yerramalli |
| 2019/0166625 A1 | 5/2019 | Nam |
| 2019/0173521 A1 | 6/2019 | Liu |
| 2019/0173611 A1 | 6/2019 | Liu |
| 2019/0173619 A1 | 6/2019 | Li |
| 2019/0174518 A1 | 6/2019 | Jiang |
| 2019/0174542 A1 | 6/2019 | Lei |
| 2019/0181979 A1 | 6/2019 | Wang |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0190681 A1 | 6/2019 | Li |
| 2019/0207723 A1 | 7/2019 | Lei |
| 2019/0222342 A1 | 7/2019 | Park |
| 2019/0222343 A1 | 7/2019 | Park |
| 2019/0223184 A1 | 7/2019 | Sarkis |
| 2019/0223215 A1 | 7/2019 | Tian |
| 2019/0229788 A1 | 7/2019 | Zhang |
| 2019/0230697 A1 | 7/2019 | Yang |
| 2019/0238177 A1 | 8/2019 | Liu |
| 2019/0238196 A1 | 8/2019 | Lei |
| 2019/0238219 A1 | 8/2019 | Liu |
| 2019/0238284 A1 | 8/2019 | Liu |
| 2019/0239202 A1 | 8/2019 | Bhattad |
| 2019/0245560 A1 | 8/2019 | Yang |
| 2019/0245658 A1 | 8/2019 | Yang |
| 2019/0246410 A1 | 8/2019 | Zhang |
| 2019/0246419 A1 | 8/2019 | Sun |
| 2019/0246425 A1 | 8/2019 | Zhang |
| 2019/0253219 A1 | 8/2019 | Fan |
| 2019/0253232 A1 | 8/2019 | Park |
| 2019/0254081 A1 | 8/2019 | Li |
| 2019/0260451 A1 | 8/2019 | Sarkis |
| 2019/0261323 A1 | 8/2019 | Lee |
| 2019/0261354 A1 | 8/2019 | Fakoorian |
| 2019/0268059 A1 | 8/2019 | Yang |
| 2019/0268127 A1 | 8/2019 | Hosseini |
| 2019/0268129 A1 | 8/2019 | Lin |
| 2019/0268206 A1 | 8/2019 | Yang |
| 2019/0268907 A1 | 8/2019 | Bhattad |
| 2019/0268923 A1 | 8/2019 | Sundararajan |
| 2019/0268932 A1 | 8/2019 | Sundararajan |
| 2019/0268933 A1 | 8/2019 | Sun |
| 2019/0274162 A1 | 9/2019 | Zhang |
| 2019/0280829 A1 | 9/2019 | Wei |
| 2019/0280836 A1 | 9/2019 | Bhattad |
| 2019/0288789 A1 | 9/2019 | Li |
| 2019/0288800 A1 | 9/2019 | Hosseini |
| 2019/0289602 A1 | 9/2019 | Mukkavilli |
| 2019/0289629 A1 | 9/2019 | Luo |
| 2019/0296809 A1 | 9/2019 | Li |
| 2019/0296882 A1 | 9/2019 | Li |
| 2019/0305882 A1 | 10/2019 | Wang |
| 2019/0305911 A1 | 10/2019 | Sarkis |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313260 A1 | 10/2019 | Zhang |
| 2019/0313385 A1 | 10/2019 | Yang |
| 2019/0313419 A1 | 10/2019 | Fakoorian |
| 2019/0313430 A1 | 10/2019 | Manolakos |
| 2019/0319732 A1 | 10/2019 | Manolakos |
| 2019/0319767 A1 | 10/2019 | Sun |
| 2019/0320393 A1 | 10/2019 | Hosseini |
| 2019/0320402 A1 | 10/2019 | Ji |
| 2019/0320420 A1 | 10/2019 | Zhang |
| 2019/0320424 A1 | 10/2019 | Yerramalli |
| 2019/0320452 A1 | 10/2019 | Zhang |
| 2019/0320458 A1 | 10/2019 | Hosseini |
| 2019/0327047 A1 | 10/2019 | Liu |
| 2019/0327050 A1* | 10/2019 | Pawar .................. H04L 5/0094 |
| 2019/0327062 A1 | 10/2019 | Jiang |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335447 A1 | 10/2019 | Sarkis |
| 2019/0335456 A1 | 10/2019 | Yerramalli |
| 2019/0335480 A1 | 10/2019 | Sun |
| 2019/0335481 A1 | 10/2019 | Jiang |

(56) References Cited

U.S. PATENT DOCUMENTS

| | | |
|---|---|---|
| 2019/0335490 A1 | 10/2019 | Zeng |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |
| 2019/0342836 A1 | 11/2019 | Ang |
| 2019/0349010 A1 | 11/2019 | Wu |
| 2019/0349176 A1 | 11/2019 | Li |
| 2019/0349221 A1 | 11/2019 | Jiang |
| 2019/0349897 A1 | 11/2019 | Hosseini |
| 2019/0349900 A1 | 11/2019 | Sarkis |
| 2019/0349941 A1 | 11/2019 | Yang |
| 2019/0349969 A1 | 11/2019 | Chakraborty |
| 2019/0349973 A1 | 11/2019 | Yang |
| 2019/0349974 A1 | 11/2019 | Sundararajan |
| 2019/0349992 A1 | 11/2019 | Zhang |
| 2019/0349998 A1 | 11/2019 | Bhattad |
| 2019/0356441 A1 | 11/2019 | Jiang |
| 2019/0356455 A1 | 11/2019 | Yang |
| 2019/0357150 A1 | 11/2019 | Wang |
| 2019/0357252 A1 | 11/2019 | Sun et al. |
| 2019/0357255 A1 | 11/2019 | Sun et al. |
| 2019/0363773 A1 | 11/2019 | Yerramalli et al. |
| 2019/0363853 A1 | 11/2019 | Soriaga |
| 2019/0364468 A1 | 11/2019 | Yerramalli et al. |
| 2019/0364579 A1 | 11/2019 | Zhang et al. |
| 2019/0372605 A1 | 12/2019 | Li |
| 2019/0372608 A1 | 12/2019 | Wei |
| 2019/0372712 A1 | 12/2019 | Yang |
| 2019/0373571 A1 | 12/2019 | Damnjanovic et al. |
| 2019/0373629 A1 | 12/2019 | Mukkavilli |
| 2019/0373640 A1 | 12/2019 | Sun et al. |
| 2019/0379485 A1 | 12/2019 | Jiang |
| 2019/0379518 A1 | 12/2019 | Yang |
| 2019/0379561 A1 | 12/2019 | Zhang et al. |
| 2019/0380052 A1 | 12/2019 | Yang |
| 2019/0380127 A1 | 12/2019 | Wang |
| 2019/0380147 A1 | 12/2019 | Zhang et al. |
| 2019/0386737 A1 | 12/2019 | Liu et al. |
| 2019/0387532 A1 | 12/2019 | Liu et al. |
| 2019/0393986 A1 | 12/2019 | Wang |
| 2019/0394772 A1 | 12/2019 | Li |
| 2019/0394790 A1 | 12/2019 | Damnjanovic et al. |
| 2020/0007160 A1 | 1/2020 | Li |
| 2020/0007294 A1 | 1/2020 | Yang |
| 2020/0007302 A1 | 1/2020 | Manolakos |
| 2020/0008107 A1 | 1/2020 | Zhang et al. |
| 2020/0008131 A1 | 1/2020 | Chakraborty et al. |
| 2020/0008235 A1 * | 1/2020 | Sarkis ................. H04W 72/21 |
| 2020/0008239 A1 | 1/2020 | Li |
| 2020/0014499 A1 | 1/2020 | Sun |
| 2020/0015208 A1 | 1/2020 | Noh et al. |
| 2020/0015268 A1 | 1/2020 | Zhang et al. |
| 2020/0021423 A1 | 1/2020 | Liu et al. |
| 2020/0022029 A1 | 1/2020 | Sadek et al. |
| 2020/0022136 A1 | 1/2020 | Wang |
| 2020/0029221 A1 | 1/2020 | Xue et al. |
| 2020/0029335 A1 | 1/2020 | Yang |
| 2020/0036476 A1 | 1/2020 | Yang |
| 2020/0036477 A1 | 1/2020 | Xu |
| 2020/0037235 A1 | 1/2020 | Ly |
| 2020/0037319 A1 | 1/2020 | Li |
| 2020/0037336 A1 | 1/2020 | Sun et al. |
| 2020/0037338 A1 | 1/2020 | Li |
| 2020/0037347 A1 | 1/2020 | Yang |
| 2020/0037352 A1 | 1/2020 | Yang |
| 2020/0044778 A1 | 2/2020 | Park |
| 2020/0044784 A1 | 2/2020 | Yang |
| 2020/0044793 A1 | 2/2020 | Sundararajan |
| 2020/0045556 A1 | 2/2020 | Xue |
| 2020/0045744 A1 | 2/2020 | Sun |
| 2020/0052717 A1 | 2/2020 | Wang |
| 2020/0052750 A1 | 2/2020 | Manolakos |
| 2020/0052831 A1 | 2/2020 | Yang |
| 2020/0052870 A1 | 2/2020 | Yerramalli |
| 2020/0053599 A1 | 2/2020 | Damnjanovic |
| 2020/0053658 A1 | 2/2020 | Sundararajan |
| 2020/0053739 A1 | 2/2020 | Xue |
| 2020/0053744 A1 | 2/2020 | Hosseini |
| 2020/0053801 A1 | 2/2020 | Hosseini |
| 2020/0058989 A1 | 2/2020 | Eslami et al. |
| 2020/0059854 A1 | 2/2020 | Li et al. |
| 2020/0059926 A1 | 2/2020 | Jiang |
| 2020/0067574 A1 | 2/2020 | Yang |
| 2020/0067627 A1 | 2/2020 | Bhushan |
| 2020/0067748 A1 | 2/2020 | Zhang |
| 2020/0068435 A1 | 2/2020 | Zhang |
| 2020/0068495 A1 | 2/2020 | Yang |
| 2020/0068528 A1 | 2/2020 | Abraham |
| 2020/0076563 A1 | 3/2020 | Yang |
| 2020/0083982 A1 | 3/2020 | Jiang |
| 2020/0083987 A1 | 3/2020 | Xu |
| 2020/0084759 A1 | 3/2020 | Liu |
| 2020/0084778 A1 | 3/2020 | Wang |
| 2020/0084784 A1 | 3/2020 | Jiang |
| 2020/0092041 A1 | 3/2020 | Sankar |
| 2020/0092818 A1 | 3/2020 | Jiang |
| 2020/0099436 A1 | 3/2020 | Malik |
| 2020/0099469 A1 | 3/2020 | Jiang |
| 2020/0099472 A1 | 3/2020 | Wang |
| 2020/0099560 A1 | 3/2020 | Li |
| 2020/0100116 A1 | 3/2020 | Chakraborty |
| 2020/0100226 A1 | 3/2020 | Hosseini |
| 2020/0100247 A1 | 3/2020 | Zhang |
| 2020/0100257 A1 | 3/2020 | Yang |
| 2020/0107335 A1 | 4/2020 | Xue |
| 2020/0107336 A1 | 4/2020 | Yang |
| 2020/0107360 A1 | 4/2020 | Xue |
| 2020/0107364 A1 | 4/2020 | Xue |
| 2020/0112391 A1 | 4/2020 | Yang |
| 2020/0112394 A1 | 4/2020 | Mukkavilli |
| 2020/0112396 A1 | 4/2020 | Jiang |
| 2020/0112421 A1 | 4/2020 | Ang |
| 2020/0112964 A1 | 4/2020 | Yang |
| 2020/0112983 A1 | 4/2020 | Hosseini |
| 2020/0119446 A1 | 4/2020 | Shamblin et al. |
| 2020/0176893 A1 | 6/2020 | Roe et al. |
| 2020/0260454 A1 * | 8/2020 | Dou ..................... H04L 5/0044 |
| 2020/0281007 A1 | 9/2020 | Sun et al. |
| 2020/0296762 A1 | 9/2020 | Sun et al. |
| 2020/0396443 A1 | 12/2020 | Roe et al. |
| 2020/0404663 A1 | 12/2020 | Zhang et al. |
| 2021/0160849 A1 | 5/2021 | Sun et al. |
| 2021/0190895 A1 | 6/2021 | Pajona et al. |
| 2021/0215830 A1 | 7/2021 | Sahlin et al. |
| 2021/0219296 A1 * | 7/2021 | Lei ........................ H04L 1/0007 |
| 2021/0219320 A1 | 7/2021 | Belleschi et al. |
| 2021/0266846 A1 | 8/2021 | Do et al. |
| 2021/0296765 A1 | 9/2021 | Eslami et al. |
| 2021/0314962 A1 | 10/2021 | Ashraf et al. |
| 2021/0344370 A1 | 11/2021 | Roe et al. |
| 2021/0392620 A1 | 12/2021 | Ashraf et al. |
| 2021/0392707 A1 | 12/2021 | Do et al. |
| 2022/0123977 A1 | 4/2022 | Jiang et al. |
| 2022/0123986 A1 | 4/2022 | Jiang et al. |
| 2023/0269601 A1 * | 8/2023 | Laselva ............... H04W 72/046 370/329 |

OTHER PUBLICATIONS

"Physical channels and modulation", Technical Specification, 3GPP TS 38.211 version 16.5.0, Release 16, Mar. 2021, in 134 pages.
International Search Report for PCT/US2022/072255, mailed on Aug. 18, 2022, in 4 pages.
Written Opinion for PCT/US2022/072255, mailed on Aug. 18, 2022, in 4 pages.

* cited by examiner

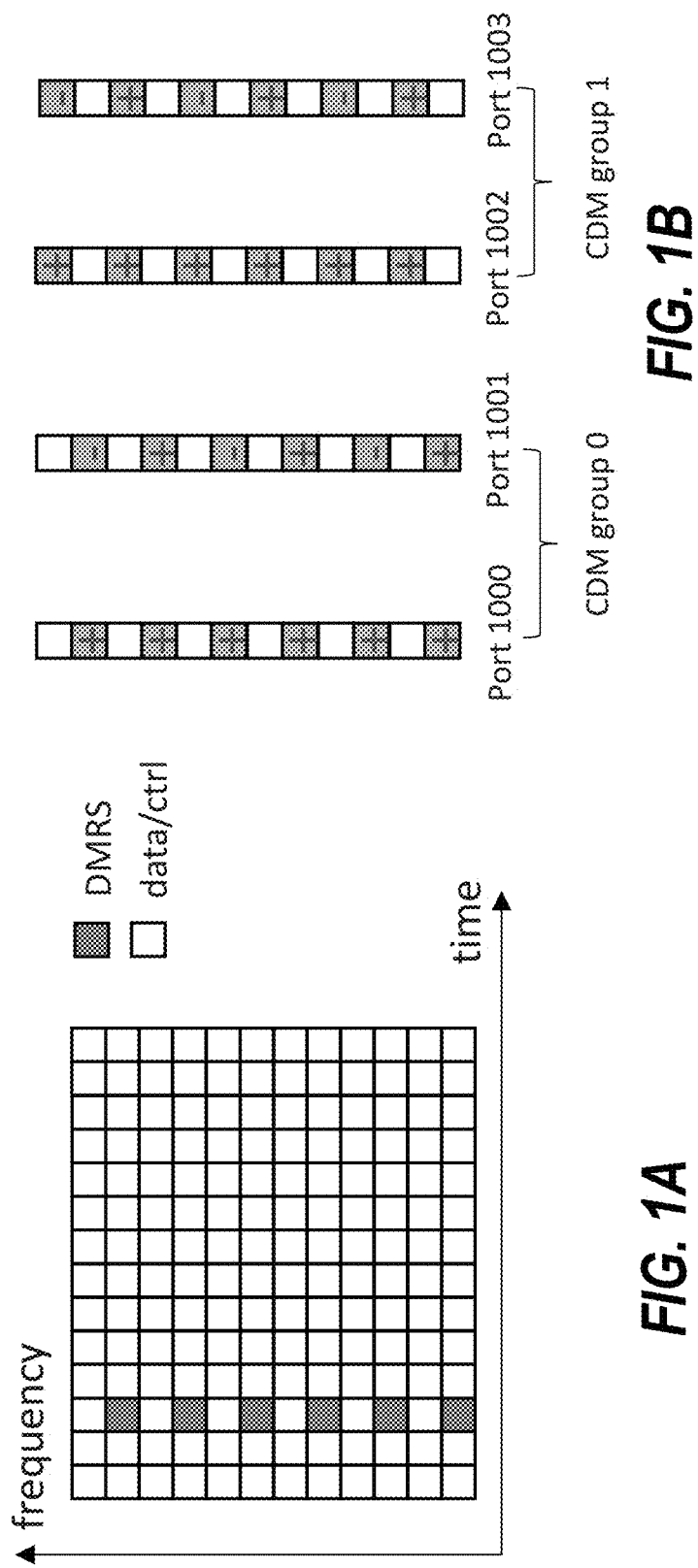

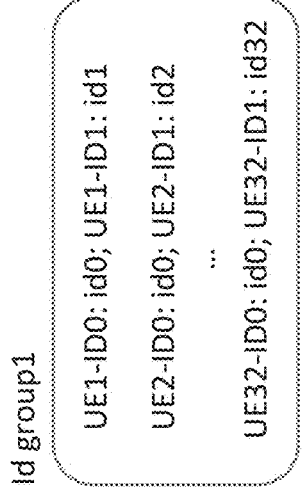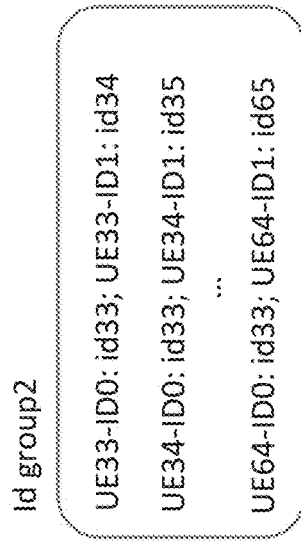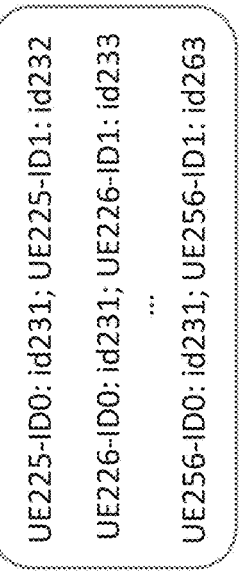
FIG. 7
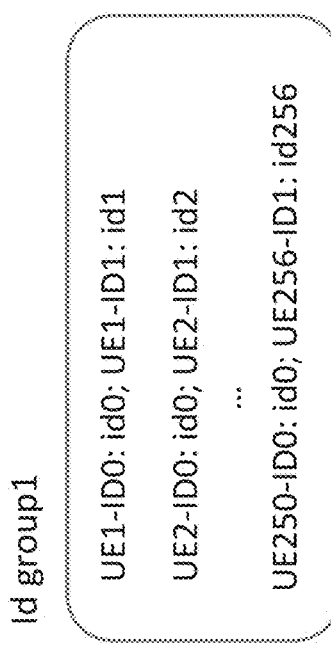
FIG. 6

SCRAMBLING IDENTIFIERS FOR WIRELESS COMMUNICATION SYSTEMS

CROSS REFERENCE TO PRIORITY APPLICATION

This application claims the benefit of priority of U.S. Provisional Patent Application No. 63/188,672, filed May 14, 2021 and titled "SCRAMBLING IDENTIFIERS FOR WIRELESS COMMUNICATION SYSTEMS," the disclosure of which is hereby incorporated by reference herein in its entirety and for all purposes.

BACKGROUND

Technical Field

Embodiments of this disclosure relate to for wireless communication systems and, more specifically, to scrambling identifiers for wireless communications.

Description of Related Technology

In a wireless communication system, there can be a plurality of user equipments (UEs) arranged to wirelessly communicate with a communications network in a particular geographic area. Reference signals, such as a demodulation reference signal (DMRS), can be used for channel estimation. There can be technical challenges related to channel estimation associated with multiple UEs and/or multiple-input multiple-output (MIMO) layers with a limited number of DMRS ports in a communications system.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of assigning scrambling identifiers. The method includes assigning, by a baseband unit, a first scrambling identifier to each user equipment of a group, such that the first scrambling identifier is the same for each of the user equipments of the group. The method also includes assigning, by the baseband unit, a second scrambling identifier to each of the user equipments of the group, such that the second scrambling identifier is different for each of the user equipments of the group.

The method can include causing transmission of a wireless communication to a particular user equipment of the group, in which the wireless communication is associated with either the first scrambling identifier or the second scrambling identifier assigned to the particular user equipment.

The method can include selecting one of the first scrambling identifier or the second scrambling identifier as a selected identifier for a particular user equipment of the group. The method can include generating a demodulation reference signal sequence based on the selected identifier. The method can include wirelessly transmitting a Physical Downlink Shared Channel (PDSCH) transmission to the particular user equipment, where the PDSCH transmission includes a demodulation reference signal associated with the demodulation reference signal sequence. The method can include wirelessly transmitting a Physical Uplink Shared Channel (PUSCH) transmission to the particular user equipment, where the PUSCH transmission includes a demodulation reference signal associated with the demodulation reference signal sequence. The method can include wirelessly transmitting information identifying the selected identifier for the particular user equipment to the particular user equipment. The method can include wirelessly transmitting a Fifth Generation New Radio demodulation reference signal associated with the demodulation reference signal sequence to the particular user equipment. The selecting one of the first scrambling identifier or the second scrambling identifier can be based on one or more of (i) whether one or more co-scheduled user equipments belong to the group or (ii) how demodulation reference signals of the one or more co-scheduled user equipments are populated into radio equipments.

The method can include randomly or pseudo-randomly selecting scrambling identifiers for assigning to the user equipments of the group. The method can includes electing scrambling identifiers for assigning to the user equipments of the group based on resulting correlation across demodulation reference signal sequences generated using the scrambling identifiers.

The method can include dividing a plurality of user equipments in groups, where the groups comprise the group and a second group. The method can include assigning a first scrambling identifier to each user equipment of the second group, where the first scrambling identifier is the same for each of the user equipments of the second group, and where the first scrambling identifier for each of the user equipments of the second group is different than the first scrambling identifier for each of the user equipments of the group. The method can include assigning a second scrambling identifier to each of the user equipments of the second group, wherein the second scrambling identifier is different for each user equipment of the second group. The method can include prior to the dividing, selecting a number of user equipments to include in the group based on one or more of a number of user equipments in a system, a number of transmission layers, or a number of supported orthogonal ports for demodulation reference signals.

The second scrambling identifier of each of the user equipments of the group can be associated with a respective Radio Network Temporary Identifier (RNTI).

Another aspect of this disclosure is a network system that includes a baseband unit and one or more radio units in communication with the baseband unit. The baseband unit includes at least one processor and stores instructions. The instructions, when executed by the at least one processor, cause the baseband unit to: assign a first scrambling identifier to each user equipment of a group of user equipments and a second scrambling identifier to each of the user equipments of the group, such that (i) the first scrambling identifier is the same for each of the user equipments of the group and (ii) the second scrambling identifier is different for each of the user equipments of the group; select one of the first scrambling identifier or the second scrambling identifier as a selected identifier for a particular user equipment of the group; and generate a demodulation reference signal sequence based on the selected identifier. The one or more radio units are configured to wirelessly transmit a demodulation reference signal to the particular user equipment of the group. The demodulation reference signal is associated with the demodulation reference signal sequence.

The one or more radio units can include a plurality of distributed remote radio units. The one or more radio units can be configured to wirelessly transmit multiple-input multiple-output communications.

Another aspect of this disclosure is a baseband system that includes a centralized unit and a distributed unit in communication with the centralized unit. The centralized unit include circuitry programmed to assign a first scrambling identifier to each user equipment of a group of user equipments and a second scrambling identifier to each of the user equipments of the group, such that (i) the first scrambling identifier is the same for each of the user equipments of the group and (ii) the second scrambling identifier is different for each of the user equipments of the group. The distributed unit includes circuitry programmed to select a particular scrambling identifier for each of the user equipments of the group.

The distributed unit can be configured to generate a demodulation reference signal sequence for a particular user equipment of the group based on the selected identifier of the particular user equipment. The distributed unit can be configured to cause wireless transmission of a Physical Downlink Shared Channel (PDSCH) transmission to the particular user equipment, where the PDSCH transmission includes a demodulation reference signal associated with the demodulation reference signal sequence. The distributed unit can be configured to cause wireless transmission of a Physical Uplink Shared Channel (PUSCH) transmission to the particular user equipment, where the PUSCH transmission includes a demodulation reference signal associated with the demodulation reference signal sequence. The distributed unit can be configured to cause wireless transmission of information identifying the selected identifier for the particular user equipment to the particular user equipment. The distributed unit can be configured to cause wireless transmission of a Fifth Generation New Radio demodulation reference signal associated with the demodulation reference signal sequence to the particular user equipment.

The centralized unit Can be configured to divide a plurality of user equipments in groups, wherein the groups comprise the group and a second group. The centralized unit can be configured to divide a plurality of user equipments in groups, where the groups include the group and a second group. The circuitry of the centralized unit can be programmed to assign a first scrambling identifier to each user equipment of the second group and a second scrambling identifier to each of the user equipments of the second group, such that (i) the first scrambling identifier is the same for each of the user equipments of the second group, (ii) the second scrambling identifier is different for each of the user equipments of the second group, (iii) the first scrambling identifier for each of the user equipments of the second group is different than the first scrambling identifier for each of the user equipments of the group.

The second scrambling identifier of each of the user equipments of the group can be associated with a respective Radio Network Temporary Identifier (RNTI).

Another aspect of this disclosure is computer-readable storage comprising instructions that, when executed by one or more processors, cause any of the methods disclosed herein to be performed.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIGS. 1A and 1B illustrate an example demodulation reference signal (DMRS) configuration.

FIG. 6 shows an example of scrambling IDs of a group of user equipments assigned according to an embodiment.

FIG. 7 shows another example of scrambling IDs of groups of UEs assigned according to an embodiment.

DETAILED DESCRIPTION OF CERTAIN EMBODIMENTS

Figures 2A, 2B:
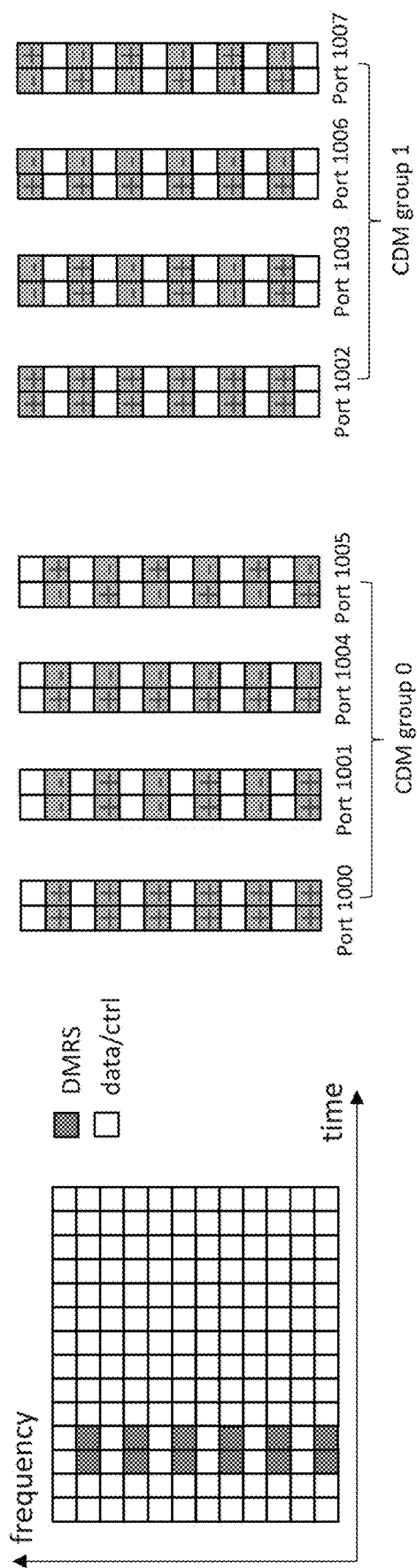
FIGS. 2A and 2B illustrate another example DMRS configuration.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

In New Radio (NR) standards for fifth generation (5G) wireless communications, demodulation reference signals (DMRSs) provide flexibility to cater for different deployment scenarios and use cases. For example, a front-loaded single-symbol DMRS, corresponding to FIG. 1A, can be configured to enable low latency and high data throughput scenarios. The DMRS can be used to estimate a radio channel for demodulation. The DMRS can be UE-specific. The DMRS can be beamformed, confined in a scheduled resource, and transmitted as desired. The DMRS can be used for downlink and uplink.

The configuration corresponding to FIGS. 1A and 1B can support up to 4 orthogonal antenna ports for multiple-input multiple-output (MIMO) wireless communications, such as multi-user MIMO (MU-MIMO) wireless communications and/or multi-layer MIMO wireless communications. The 4 orthogonal ports can be achieved by joint frequency division multiplexing (FDM) and code divisional multiplexing (CDM), for example, as shown in FIGS. 1A and 1B. FIG. 1A illustrates FDM. FIG. 1B illustrates two different CDM groups with two ports each.

Figures 3A, 3B:
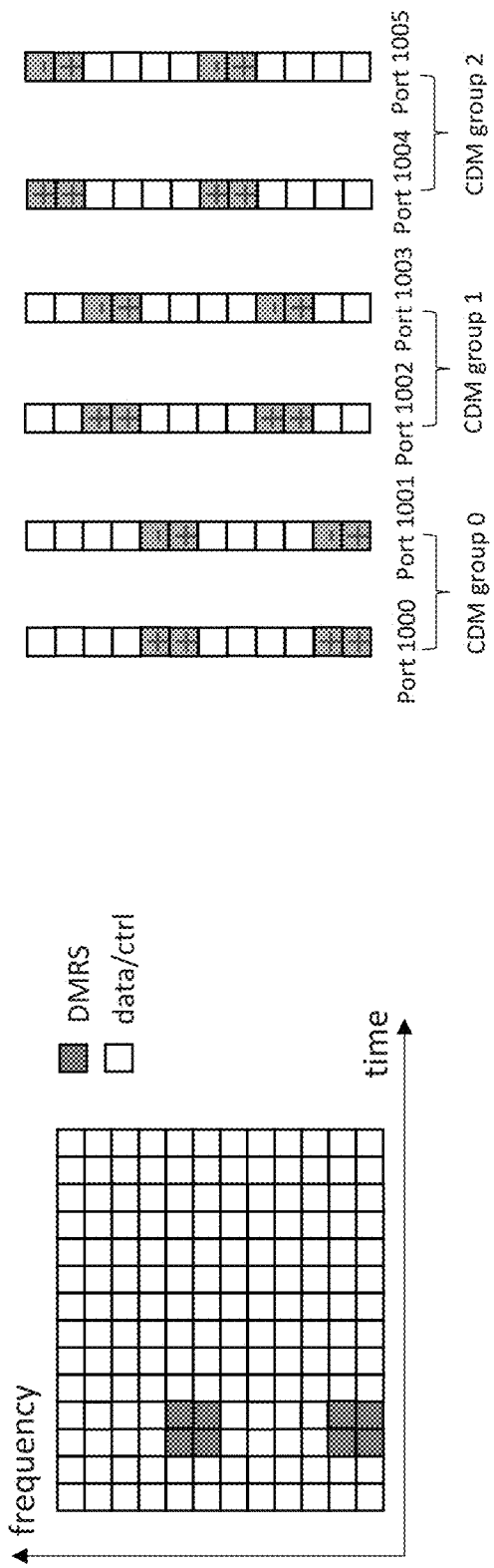
FIGS. 3A and 3B illustrate another example DMRS configuration.

FIGS. 1A and 1B are one example of DMRS resource mapping. Any suitable principles and advantages disclosed herein can be implemented with any suitable DMRS resource mapping. For example, FIGS. 2A to 3B illustrate two other suitable DMRS resource mappings. FIGS. 2A and 2B illustrate an example of DMRS resource mapping. For the resource mapping of FIGS. 2A and 2B, there can be 8 orthogonal ports with a 2-symbol DMRS and two CDM groups with four ports each. FIGS. 3A and 3B illustrate another example of DMRS resource mapping. For the resource mapping of FIGS. 3A and 3B, there can be 6 orthogonal ports with joint FDM and CDM.

This disclosure provides technical solutions related to demodulation reference signal (DMRS) scrambling identifiers (IDs) for user equipments (UEs). A DMRS sequence can be generated or determined based on a scrambling ID. As one example, a DMRS sequence can be generated according to the Third Generation Partnership Project (3GPP) Technical Specification 38.211 (Release 15). This DMRS sequence generation is based on a DMRS scrambling ID. The DMRS scrambling ID can be used to initialize a pseudo-random sequence generator for generating the DMRS sequence. In Technical Specification 38.211 (Release 15), each UE is assigned 2 DMRS scrambling IDs, scramblingID0 and scramblingID1. The scrambling IDs can be higher-layer parameters. Each of these two scrambling IDs can be selected from one of 65,536 different scrambling IDS (scrambling ID 0 to scrambling ID 65,535), for example.

Radio Resource Control (RRC) can configure the scrambling IDs. For each UE, the RRC can configure two DMRS scrambling IDs in certain applications. The RRC can configure three or more DMRS scrambling IDs in some applications. Downlink Control Information (DCI) can be used to dynamically select one of the DMRS scrambling IDs for a particular UE for a current Physical Downlink Shared Channel (PDSCH) and/or Physical Uplink Shared Channel (PUSCH) transmission. The RRC configured scrambling IDs for a UE can remain unchanged after the UE is attached. The RRC configured scrambling IDs for a UE can remain unchanged after the UE is attached until the UE is unattached.

As discussed above, with the configuration illustrated in FIGS. 1A and 1B, 4 orthogonal DMRS/antenna ports can be supported via joint FDM and CDM. For complete orthogonality within an FDM group, there may be no additional requirements on the associated DMRS sequences. For complete orthogonality within a CDM group, the associated DMRS sequences should be the same, e.g., generated from the same DMRS scrambling ID. For non-orthogonal DMRS ports, channel estimation performance is typically degraded. If DMRS ports are non-orthogonal with DMRS sequences generated from different DMRS scrambling IDs, channel estimation degradation may be acceptable. However, if DMRS ports are non-orthogonal with DMRS sequences generated from the same DMRS scrambling ID, channel estimation degradation can be significant and should typically be avoided.

With a particular number of orthogonal ports (e.g., 4), a technical problem is how to assign DMRS scrambling IDs to UEs in order to support up to a selected number of MU-MIMO layers (e.g., 16) with better channel estimation. Objectives in solving this technical problem can include utilizing orthogonal DMRS ports if possible and otherwise avoiding overlaid DMRS ports from two UEs with the same DMRS scrambling IDs.

One approach to DMRS scrambling ID assignment involves assigning two common DMRS scrambling IDs to all UEs. This approach can result in overlaid DMRS ports. With overlaid DMRS ports, there can be significant degradation in channel estimation.

Another approach to DMRS scrambling ID assignment involves assigning different scrambling IDs for all UEs. This approach may not do a good job of utilizing orthogonal DMRS ports.

Aspects of this disclosure relate to assigning DMRS scrambling IDs to UEs of a group by assigning a common DMRS scrambling ID to each UE of the group and also assigning a unique DMRS ID to each of the UEs of the group. This technical solution can avoid overlaid DMRS ports from two UEs with the same DMRS scrambling IDs and use available pairwise orthogonal DMRS ports.

Figure 4:
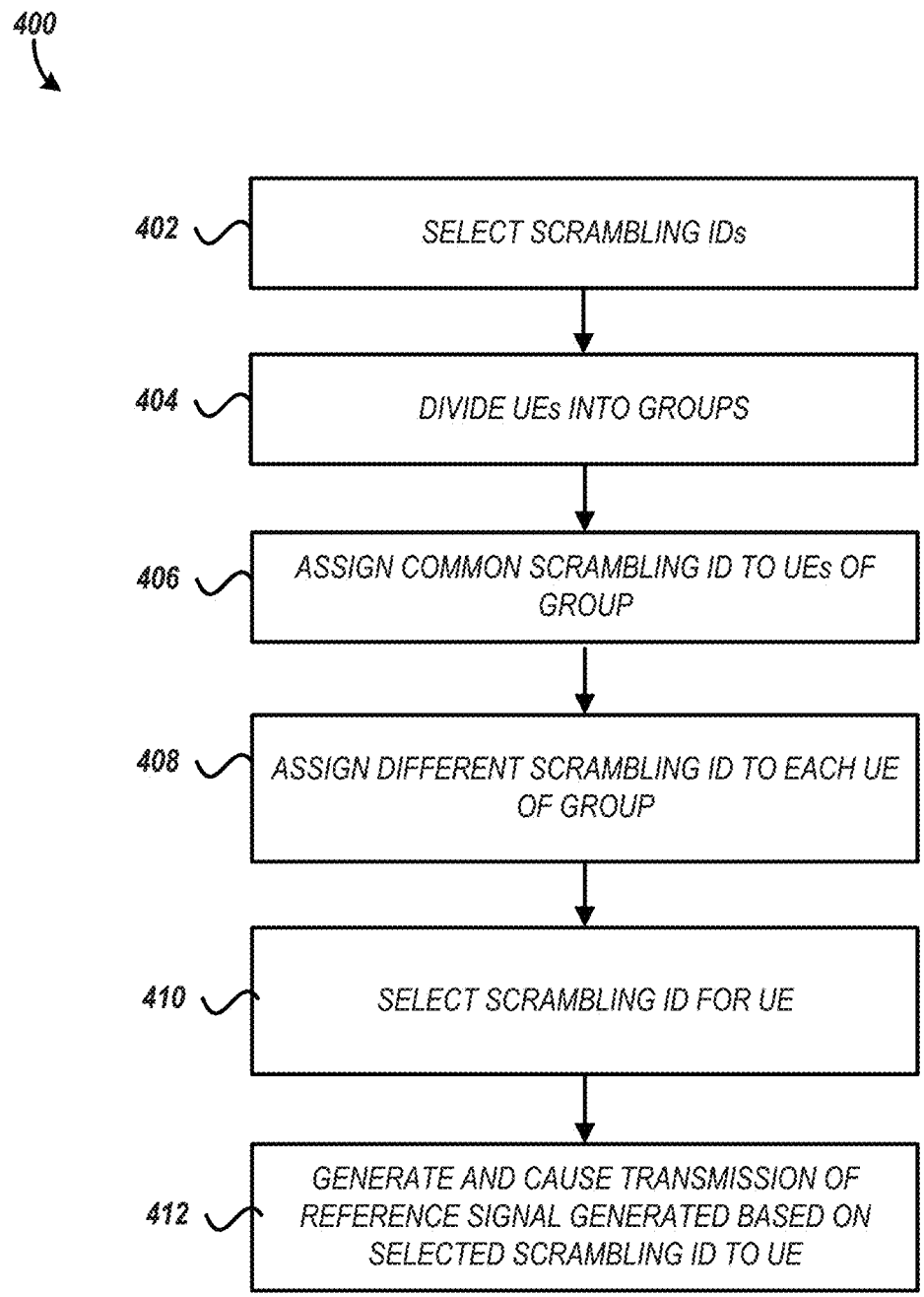
FIG. 4 is a flow diagram of an example method of assigning scrambling identifiers (IDs) according to an embodiment.

FIG. 4 is a flow diagram of an example method 400 of assigning scrambling IDs according to an embodiment. The scrambling IDs assigned by the method 400 can be DMRS scrambling IDs. Such DMRS scrambling IDs can be as defined by a 5G NR standard in certain applications. Any other suitable scrambling IDs can be assigned in accordance with any suitable principles and advantages of the method 400. The method 400 can be performed by any suitable circuitry and/or hardware, such as a baseband unit (BBU) specifically configured to perform the method. The operations of the method 400 can be baseband operations. The method 400 can be applied to downlink DMRSs and/or uplink DMRSs.

At block 402, scrambling IDs are selected. When there are N UEs in a system, N+X different scrambling IDs can be selected. X can be a positive integer representing a number of group(s) of UEs for scrambling ID assignment. The scrambling IDs can be selected from one of 65,536 scrambling IDs (e.g., scrambling ID0, scrambling ID1, . . . , scrambling ID 65535) in certain applications. For example, in downlink applications, the corresponding RRC configurations can be DMRS-DownlinkConfig: scramblingID0: INTEGER (0 . . . 65535); and scramblingID1: INTEGER (0 . . . 65535). As another example, in uplink applications, the corresponding RRC configurations can be DMRS-UplinkConfig: scramblingID0: INTEGER (0 . . . 65535); and scramblingID1: INTEGER (0 . . . 65535).

The UEs are divided into groups at block 404. The N UEs can be divided into X groups for scrambling ID assignment. Each of these X groups can contain N/X UEs. Each of the X groups can be allocated N/X+1 scrambling IDs.

For each UE in a group, scrambling IDs can be assigned. At block 406, a common scrambling ID is assigned to each UE in a group. Accordingly, one scrambling ID for each UE of the group is the same (i.e., the common scrambling ID) after the method 400. The common scrambling ID is from the group of N/X+1 scrambling IDs for the group. The common scrambling ID can be scramblingID0 associated with each UE of the group. The remaining N/X scrambling IDs of the N/X+1 scrambling IDs for the group can be assigned such that each UE of the group is associated with a different scrambling ID than all other UEs of the group. At block 408, a different scrambling ID is assigned to each UE of the group. The different scrambling ID can be scramblingID1 associated with each UE of the group, where scramblingID1 is different for each UE of the group. The different scrambling ID can be unique for each of the UEs of the groups. Blocks 406 and 408 can be performed for each group of UEs. The operations for assigning scrambling IDs for different groups can be performed in parallel and/or serial. The operations for assigning scrambling IDs at blocks 406 and 408 can be performed in parallel and/or serial. While assigning a common scrambling ID is shown first in the method 400, assigning different scrambling IDs can be performed before or concurrently with assigning a common scrambling ID in various applications.

In some applications, the different scrambling ID (e.g., scramblingID1) for one or more UEs is related to a Radio Network Temporary Identifier (RNTI) of a respective UE. The different scrambling ID (e.g., scramblingID1) can be associated with any suitable identifier of a UE in various applications.

Scrambling IDs can be selected for group assignment in a variety of different ways. In some applications, scrambling IDs can be randomly or pseudo-randomly selected from available scrambling IDs (e.g., scrambling IDs 0 to 65535). In certain applications, a set of scrambling IDs can be selected for assigning to UEs based on a resulting correlation across DMRS sequences generated using the scrambling identifiers. For example, a set of scrambling IDs resulting in lower correlation across the generated DMRS sequences can be selected for assignment to UEs. In an embodiment, a set of common scrambling IDs for groups (e.g., ID0s) that result in relatively low correlation across the generated DMRS sequences can be selected.

The number of scrambling ID groups X can be selective based on one or more of a variety of factors. Example factors for selecting the number of scrambling ID groups can include, but are not limited to, a number of UEs in a system, a number of transmission layers, a number of orthogonal ports the DMRS configuration can support, the like, or any suitable combination thereof.

For ease of description, the discussion of FIG. 4 may assume N is divisible by X. If N is not divisible by X, a smaller number of scrambling IDs and UEs can be allocated to one or more of the X groups.

After scrambling IDs are assigned to UEs, a scrambling ID can be selected for a particular UE at block 410. The selected scrambling ID can be the common scrambling ID assigned at block 406 or the different scrambling ID assigned at block 408. DCI can be used to select the scrambling ID for a particular UE. The selected scrambling ID can be selected dynamically. For each UE with assigned scrambling IDs being scheduled, one of the scrambling IDs can be selected. Information identifying the selected scrambling ID can be wirelessly transmitted to the particular UE. The particular UE can use the information identifying the selected scrambling ID to descramble a DMRS received by the particular UE.

In certain embodiments, selecting a scrambling ID from the assigned scrambling IDs for a particular UE can depend on one or more properties associated with one or more co-scheduled UEs. For example, scrambling ID selection for a particular UE can depend on whether one or more co-scheduled UEs belong to the same scrambling ID group or one or more different scrambling ID groups. Alternatively or additionally, scrambling ID selection for a particular UE can depend on how the DMRSs of co-scheduled UEs are populated into radio equipment.

In some applications, for each UE, two RRC configured DMRS scrambling IDs (e.g., scramblingID0 and scramblingID1) have different values than the other UEs.

The selected scrambling ID for a particular UE can be used to generate a reference signal sequence. A BBU can then cause transmission of a wireless communication to the particular user equipment that is associated with selected scrambling ID. Referring to FIG. 4, at block 412, a DMRS sequence can be generated for a particular UE based on the scrambling ID for the particular UE that was selected at block 410. The DMRS can sequence can be generated, for example, as discussed above. Then a baseband system of a communications network can cause wireless transmission of the DMRS to the particular UE at block 412. A radio unit of the communications network can wirelessly transmit the DMRS to the particular UE. The DMRS can be included in a PDSCH transmission. The DMRS can be included in a PUSCH transmission. The DMRS can be included in any other suitable wireless transmission with a DMRS, such as a Physical Downlink Control Channel (PDCCH) transmission, a Physical Uplink Control Channel (PUCCH) transmission, or the like.

Figure 5:
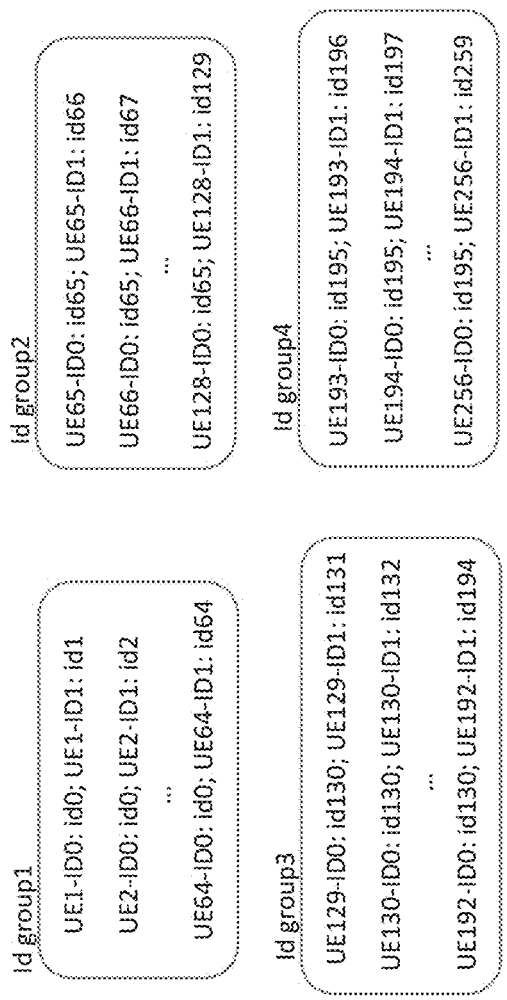
FIG. 5 shows an example of scrambling IDs of groups of user equipments (UEs) assigned according to an embodiment.

FIG. 5 shows an example of scrambling IDs of groups of UEs assigned according to an embodiment. The scrambling IDs can be assigned by the method 400, for example. The scrambling IDs can be used to generate DMRS sequences. In the example shown in FIG. 5, there are N=256 UEs and X=4 groups. Each group has N/X=64 UEs. There are N+X=260 scrambling IDs to assign among the N UEs. A first scrambling ID can be common for UEs of the same group and different for UEs of different groups. A second scrambling ID can be unique for each UE of the 4 groups.

In the first group of UEs Id group1, each UE has a common first scrambling ID and a different second scrambling ID. As shown in FIG. 5, scrambling ID0 for each UE of first group is id0. As also shown in FIG. 5, scrambling ID1 for each UE of first group is different for each UE of the first group. For example, the scrambling ID1 for UE1 is id1, the scrambling ID1 for UE2 is id2, and the scrambling ID1 for UE64 is id64.

In the second group of UEs Id group2, each UE has a common first scrambling ID and a different second scrambling ID. The common first scrambling ID for each UE of the second group of UEs is different than the common first scrambling ID for each UE of the first group of UEs. As shown in FIG. 5, scrambling ID0 for each UE of second group is id65. As also shown in FIG. 5, scrambling ID1 for each UE of second group is different for each UE of the second group. For example, the scrambling ID1 for UE65 is id66, the scrambling ID1 for UE66 is id66, and the scrambling ID1 for UE128 is id129.

In the third group of UEs Id group3, each UE has a common first scrambling ID and a different second scrambling ID. The common first scrambling ID for each UE of the third group of UEs is different than the common first scrambling ID for each of the UEs of the first and second groups of UEs. As shown in FIG. 5, scrambling ID0 for each UE of third is id130. As also shown in FIG. 5, scrambling ID1 for each UE of third group is different for each UE of the third group. For example, the scrambling ID1 for UE129 is id131, the scrambling ID1 for UE130 is id132, and the scrambling ID1 for UE192 is id194.

In the fourth group of UEs Id group4, each UE has a common first scrambling ID and a different second scrambling ID. The common first scrambling ID for each UE of the fourth group of UEs is different than the common first scrambling ID for the UEs of the first, second, and third groups of UEs. As shown in FIG. 5, scrambling ID0 for each UE of fourth group is id195. As also shown in FIG. 5, scrambling ID1 for each UE of fourth group is different for each UE of the fourth group. For example, the scrambling ID1 for UE193 is id196, the scrambling ID1 for UE194 is id197, and the scrambling ID1 for UE256 is id259.

In an example use case, 8 UEs can wirelessly communicate over 1 layer per UE. In this example, 6 UEs can be in the first group and 2 UEs can be in the second group. For the 6 UEs in the first group, the following selections can be made for scrambling identifier and frequency division multiplexing:

UE1-ID0-FDM0, UE2-ID0-FDM0
UE3-ID0-FDM1, UE4-ID0-FDM1
UE5-ID1-FDM0, UE6-ID1-FDM1.

FIG. 6 shows another example of scrambling IDs of a group assigned according to an embodiment. This example corresponds to supporting up to 16 layers of wireless transmission. The scrambling IDs can be assigned by the method 400, for example. The scrambling IDs can be used to generate DMRS sequences. In the example shown in FIG. 6, there are N=256 UEs and X=1 group. The group has 256 UEs where each UE of the group has a common first scrambling ID and a different second scrambling ID. With one group, for a smaller number of UEs scheduled (e.g., 4), orthogonal DMRS ports can be exploited. For a relatively large number of UEs schedule, a single group may not achieve pairwise orthogonal DMRS ports.

FIG. 7 shows another example of scrambling IDs of a plurality of groups assigned according to an embodiment. This example corresponds to supporting up to 16 layers of wireless transmission. The scrambling IDs can be assigned by the method 400, for example. The scrambling IDs can be used to generate DMRS sequences. In the example shown in FIG. 7, there are N=256 UEs and X=8 groups. Each of the 8 groups has 32 UEs where each UE of the group has a common first scrambling ID and a different second scrambling ID. With eight groups, there can be a higher probability of achieving pairwise orthogonal DMRS ports for a relatively large number of UEs scheduled compared to having fewer groups of DMRS scrambling IDs. With a smaller number of UEs scheduled (e.g., 4), orthogonal DMRS ports may not be exploited with this example with 256 UEs and 8 scrambling ID groups.

In the current NR specifications (e.g., Release 15 and Release 16), there are up to 2 RRC configured DMRS scrambling IDs for each UE. Any suitable features related to scrambling IDs disclosed herein can be applied to such NR specifications.

Although certain embodiments disclosed herein relate to two scrambling IDs for each UE, any suitable principles and advantages disclosed herein can be applied to methods, systems, and computer readable media where there are three or more scrambling IDs associated with one or more UEs. Example methods and scrambling ID assignments where each UE is associated with 3 scrambling IDs are discussed with reference to FIGS. 8 to 11. The 3 scrambling IDs for each UE can be RRC configured scrambling IDs.

Figure 8:
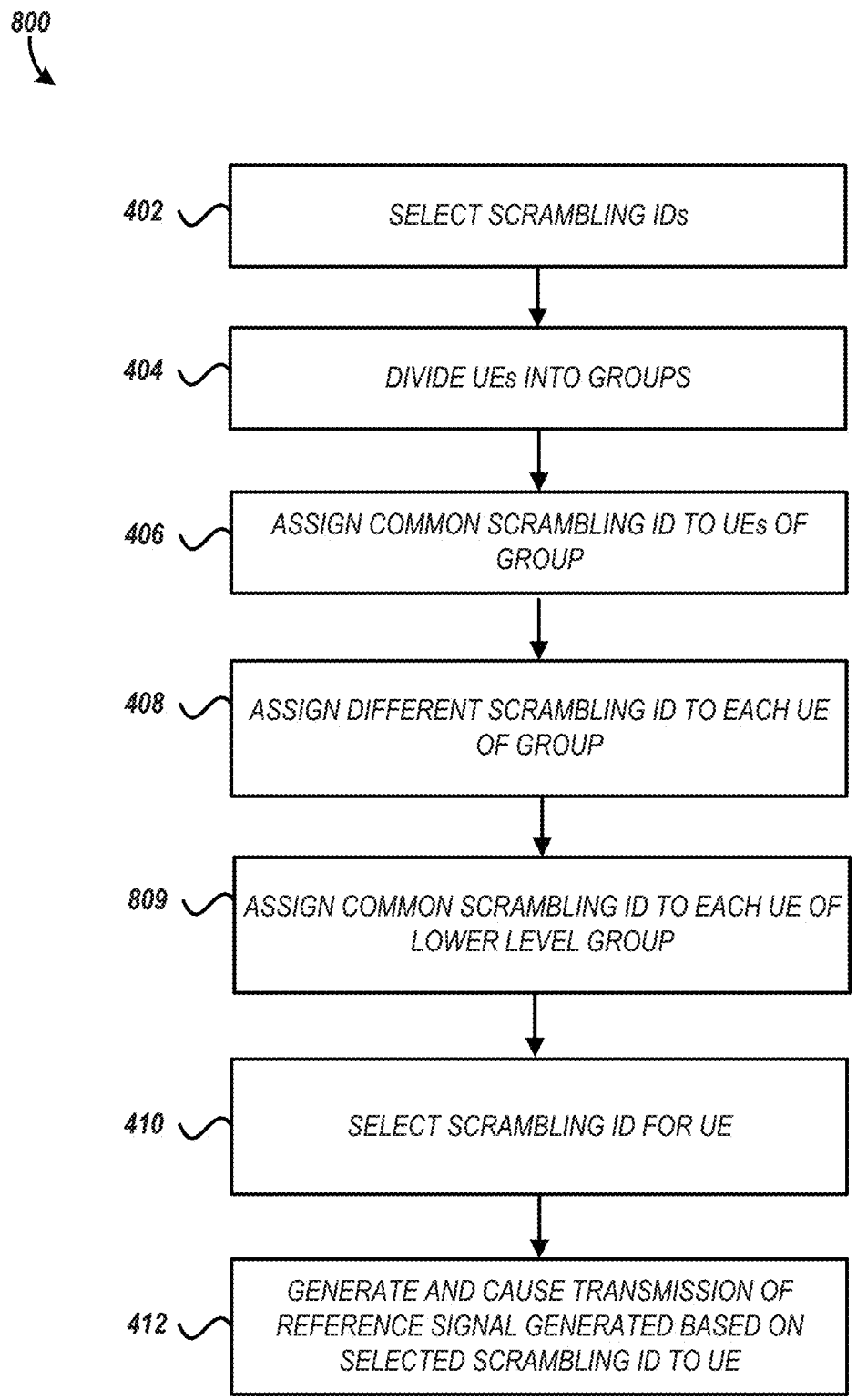
FIG. 8 is a flow diagram of another example method of assigning scrambling IDs according to an embodiment.

FIG. 8 is a flow diagram of an example method 800 of assigning scrambling IDs according to an embodiment. Each UE is assigned 3 different scrambling IDs in the method 800. The method 800 can include any suitable features of the method 400 applied to applications were there are 3 scrambling IDs associated with each UE. The scrambling IDs assigned by the method 800 can be DMRS scrambling IDs The method 800 can be performed by any suitable circuitry and/or hardware, such as a BBU specifically configured to perform the method.

In the method 800, each UE of a group is assigned a common scrambling ID at block 406, assigned a different scrambling ID at block 408, and assigned a common lower level group scrambling ID at block 809. The method 800 is similar to the method 400, except that in the method 800 a group of UEs is divided into a lower level groups and common lower level group scrambling IDs are assigned at block 809. The groups identified at block 404 are higher level groups. Selecting a scrambling ID at block 410 of the method 800 involves selecting among 3 scrambling IDs. A reference signal can be generated based on the selected scrambling ID at block 412. A baseband unit can cause wireless transmission of the reference signal to a particular UE associated with the selected scrambling ID can be at block 412.

Figure 9:
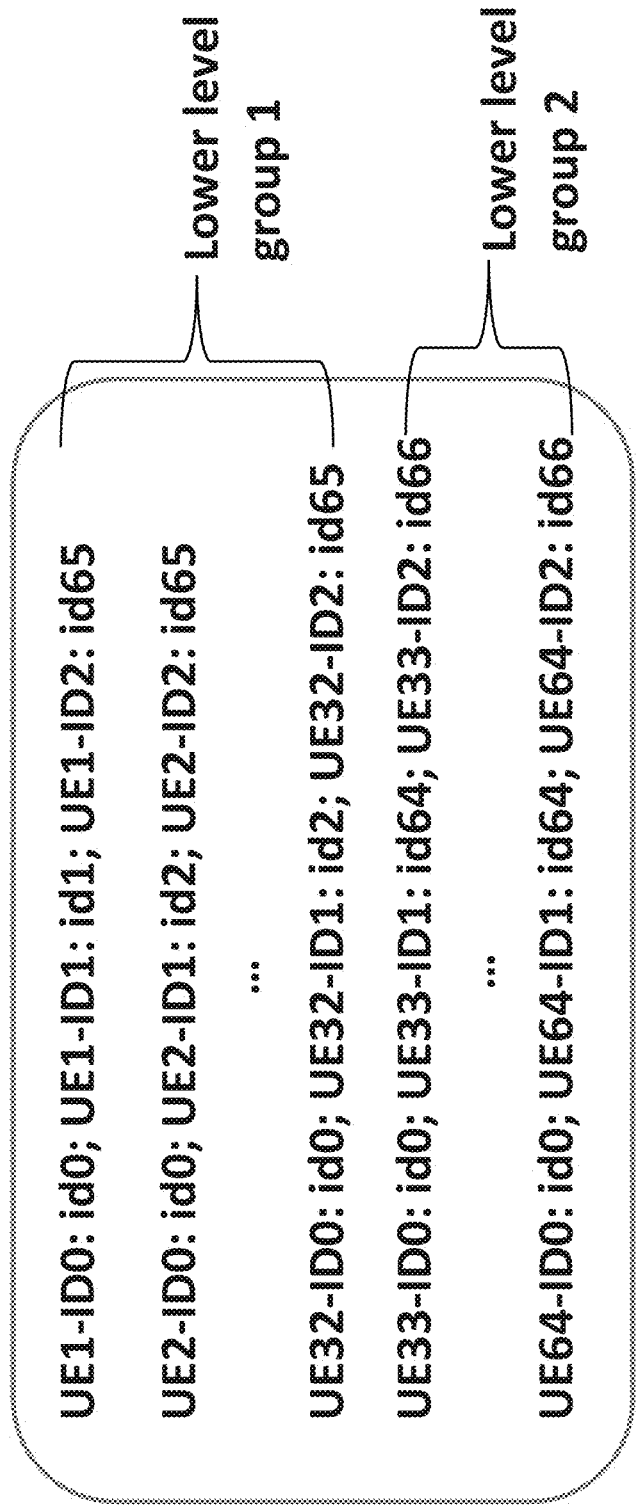
FIG. 9 shows an example of scrambling IDs of a group of UEs assigned according to an embodiment.

FIG. 9 shows an example of scrambling IDs of a group of UEs assigned according an embodiment. FIG. 9 shows scrambling IDs for one group of a plurality of groups of UEs. The scrambling IDs of FIG. 9 can be assigned by the method 800. The scrambling IDs can be used to generate DMRS sequences. In the example shown in FIG. 9, there are 64 UEs in a group. The group is divided into two lower level groups that each have 32 UEs. In the group of UEs corresponding to FIG. 9, each UE has a common first scrambling ID, a different second scrambling ID, and a common lower level group scrambling ID. Within the group, each of the UEs has the same first scrambling ID, a unique second scrambling ID, and a third ID that is common to a subset of UEs of the group. As shown in FIG. 9, scrambling ID0 for each UE of the group is id0. As also shown in FIG. 9, scrambling ID1 for each UE of the group is different for each UE of the first group. For example, the scrambling ID1 for UE1 is id1, the scrambling ID1 for UE2 is id2, and the scrambling ID1 for UE64 is id64.FIG. 9 also illustrates that scrambling ID2 in the same for each UE of a lower level group, but different for UEs of different lower level groups. For example, the scrambling ID2 is id65 for UE 1 to UE32of lower level group 1 and the scrambling ID2 is id66 for UE 33 to UE 64 of lower level group 2.

Figure 10:
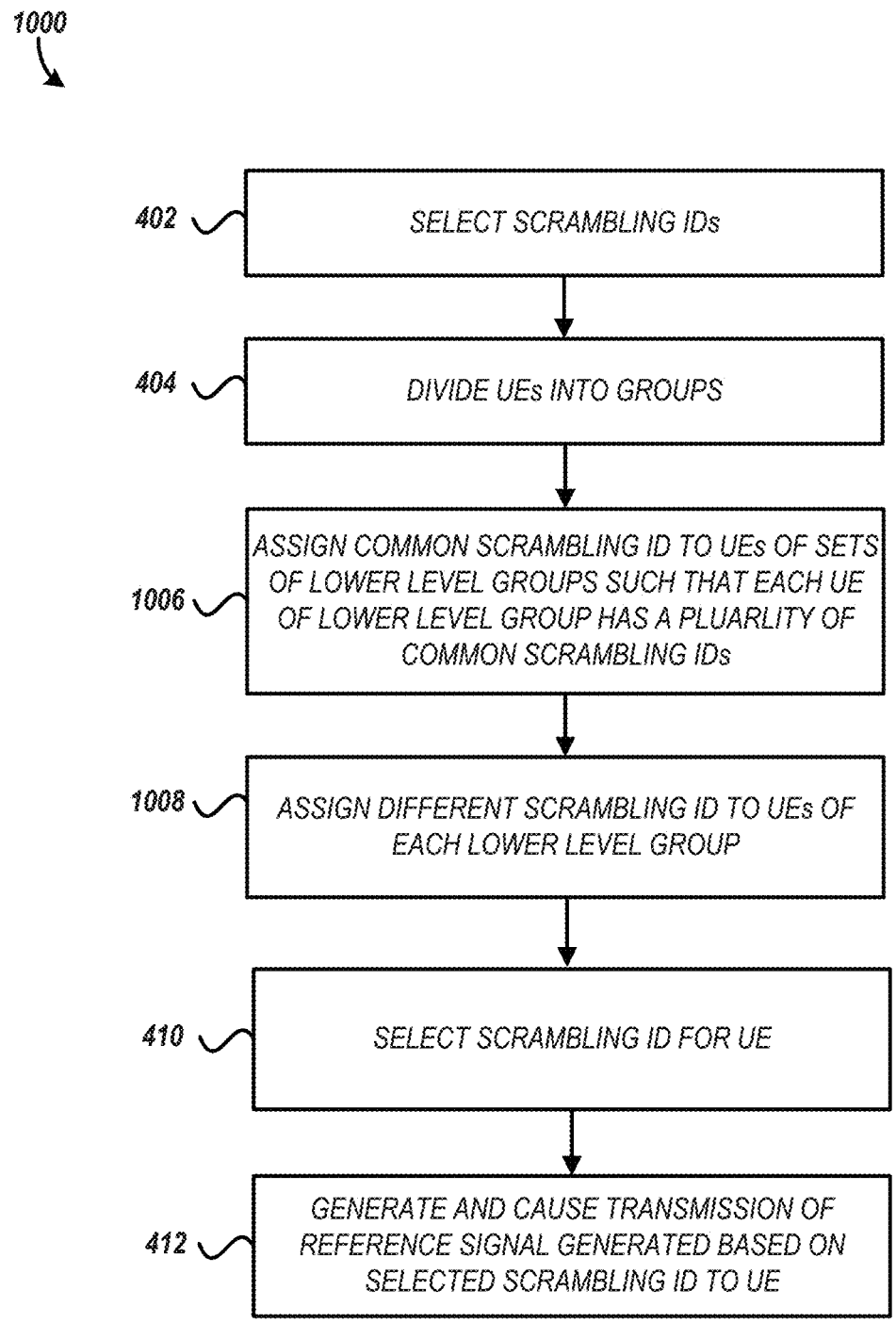
FIG. 10 is a flow diagram of another example method of assigning scrambling IDs according to an embodiment.

FIG. 10 is a flow diagram of an example method 1000 of assigning scrambling IDs according to an embodiment. The method 1000 can be performed by any suitable circuitry and/or hardware, such as a BBU specifically configured to perform the method. The scrambling IDs assigned by the method 1000 can be DMRS scrambling IDs. Each UE is assigned 3 scrambling IDs in the method 1000. After scrambling IDs are selected at block 402 and UEs are divided into higher level groups at block 404, higher level groups of UEs are divided into lower level groups. Common scrambling IDs are assigned to UEs of sets of lower level groups such that each UE of a lower level group has a plurality of common scrambling IDs that are shared with other lower level groups of the group at block 1006. Then at block 1008 a different scrambling ID is assigned to each UE of a lower level group. Thus, a lower level group includes a group of UEs with two common scrambling IDs that are the same for each UE of the lower level group and a different scrambling ID that is unique for each UE of the group.

As an example, a higher level group of UEs can be divided into three lower level groups in an embodiment of the method 1000. UEs of lower level group 1 and lower level group 2 can share a common scrambling ID0 assigned at block 1006. UEs of lower level group 1 and lower level group 3 can share a common scrambling ID1 assigned at block 1006. UEs of lower level group 2 and lower level group 3 can share a common scrambling ID2 assigned at block 1006. Each UE of the higher level group has a different scrambling ID assigned at block 1008 that is unique among UEs of the higher level group. The different scrambling ID can be unique among UEs of a plurality of higher level groups. UEs of lower level group 1 can have different scrambling ID2s that are unique among UEs of the higher level group. UEs of lower level group 2 can have different scrambling ID1s that are unique among UEs of the higher level group. UEs of lower level group 3 can have different scrambling ID0s that are unique among UEs of the higher level group.

After scrambling IDs are assigned, a scrambling ID can be selected for each UE at block 410. A reference signal can be generated based on the selected scrambling ID at block 412. A baseband unit can cause wireless transmission of the reference signal to a particular UE associated with the selected scrambling ID can be at block 412.

Figure 11:
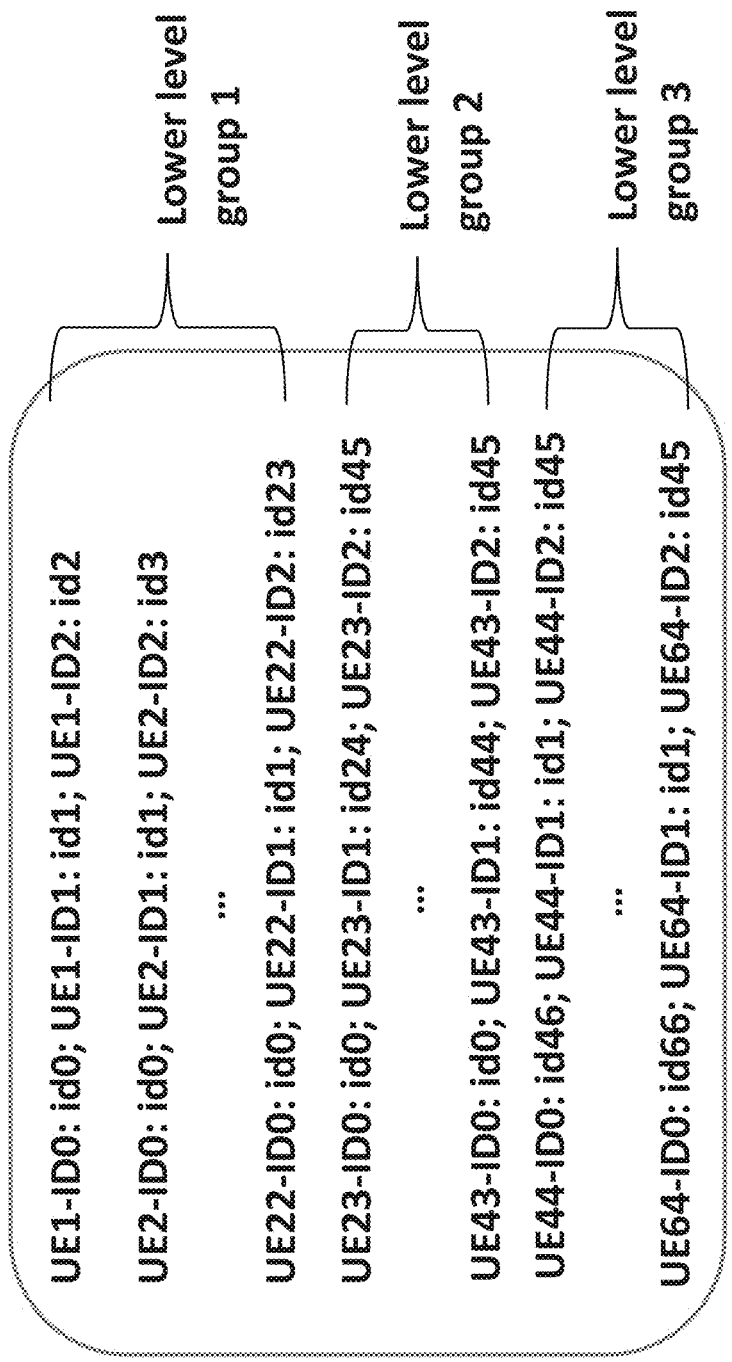
FIG. 11 shows an example of DMRS scrambling IDs of a group of UEs that can be assigned according to an embodiment.

FIG. 11 shows an example of scrambling IDs of a group of UEs assigned according to an embodiment. FIG. 11 shows scrambling IDs for one higher level group of a plurality of higher level groups of UEs. The scrambling IDs of FIG. 11 can be assigned by the method 1000, for example. The scrambling IDs of FIG. 11 can be used to generate DMRS sequences. In the example shown in FIG. 11, there are 64 UEs in a higher level group. The higher level group is divided into three lower level groups of 22 UEs, 21 UEs, and 21 UEs. Each of the lower level groups of FIG. 11 is a group that includes two scrambling IDs that are the same among all UEs of the lower level group and one scrambling ID that is unique among all UEs of the lower level group.

Referring to FIG. 11, UEs in lower level group 1 and lower level group 2 all share a common scrambling ID0. For example, UE 1 to UE43 each have a scrambling ID0 that is id0. UEs in lower level group 1 also have scrambling ID1 that is shared with UEs of lower level group 3 and different scrambling ID2s that are unique among UEs of the higher level group. UEs in lower level group 2 also have scrambling ID2 that is shared with UEs of lower level group 3 and different scrambling ID1 s that are unique among UEs of the higher level group. UEs in lower level group 1 and lower level group 3 all share a common scrambling ID1. UEs in lower level group 3 further also have a common scrambling ID2 shared with UEs of lower level group 2 and different scrambling ID0s that are unique among UEs of the higher level group.

Figure 12:
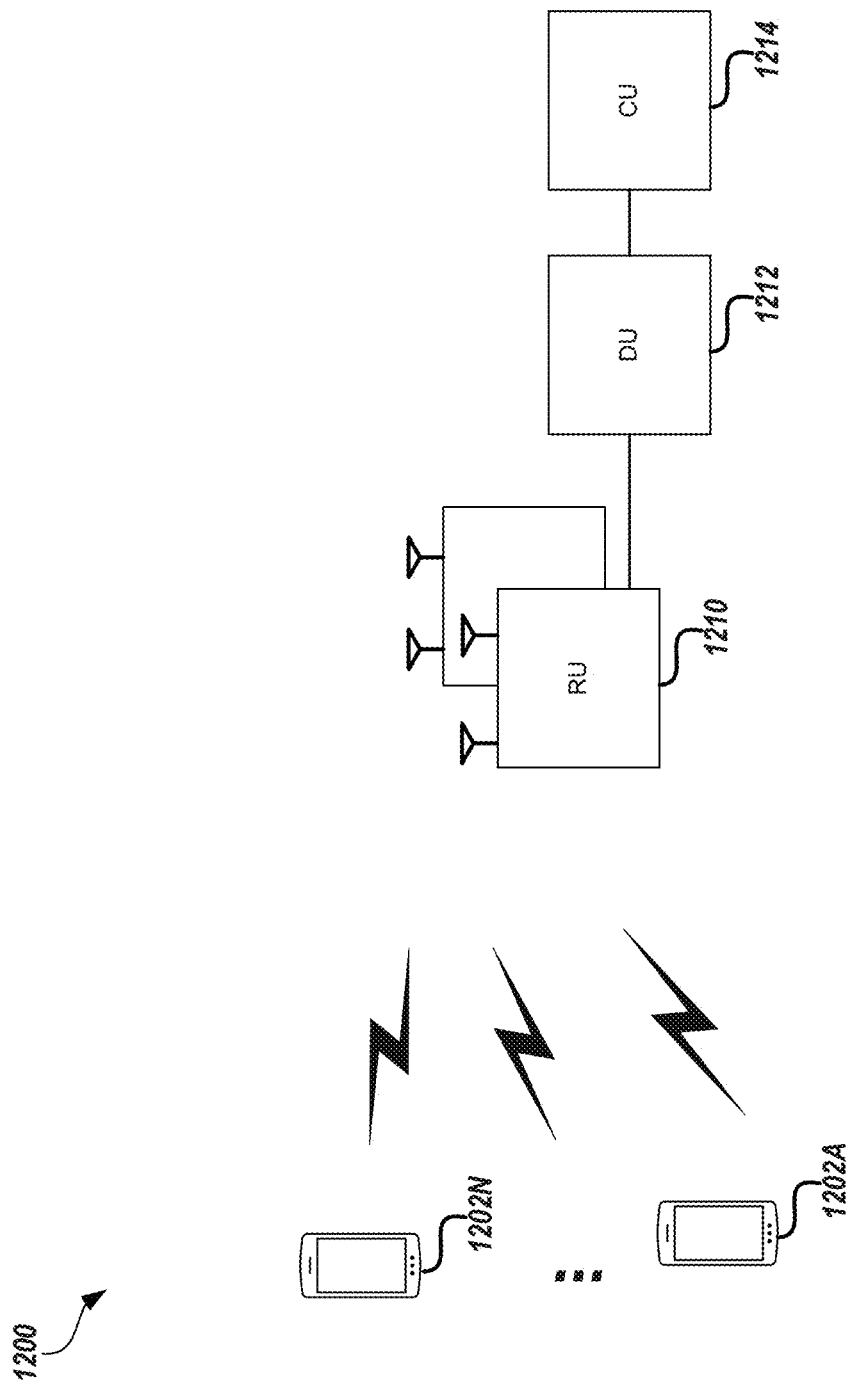
FIG. 12 is a schematic block diagram of a communication environment where scrambling IDs are used.

FIG. 12 is a schematic block diagram of an example communication environment 1200 where scrambling IDs are used. In the communication environment 1200, a plurality of UEs 1202A to 1202N wirelessly communicate with a network system. The network system includes at least one radio unit and a BBU. The illustrated network system includes radio units 1210, a distributed unit (DU) 1212, and a centralized unit (CU) 1214. A gNodeB (gNB) can include the DU 1212 and the CU 1214. A BBU can include the DU 1212 and the CU 1214. The network system can wirelessly transmit DMRSs to UEs 1202A to 1202N. The network system can wirelessly transmit information identifying a selected identifier for the particular UE of the UEs 1202A to 1202N to the particular UE. As illustrated, one or more radio units 1210 can include multiple antennas. Radio units 1210 can be remote radio units. The radio units 1210 can include distributed remote radio units that are located at different physical locations. In the communication environment of FIG. 12, MIMO communications can be wirelessly transmitted between the network system and the UEs 1202A to 1202N. The scrambling IDs disclosed herein can be used for DMRS signals in MIMO applications, such as MU-MIMO applications and/or multi-layer MIMO applications.

As illustrated, the radio units 1210 are in communication with the DU 1212. The DU 1212 can implement any suitable features of a DU specified in an NR standard. The DU 1212 can perform scrambling ID selection in accordance with any suitable principles and advantages disclosed herein. The DU 1212 includes physical circuitry programmed to perform scrambling ID selection. The DU 1212 can perform user and/or rank selection. In some application, the DU 1212 can determine scrambling IDs for UEs. The DU 1212 can generate a DMRS sequences based on selected scrambling IDs. The DU 1212 can cause wireless transmission of the DMRS associated with DMRS sequences to respective UEs. The DU 1212 is in communication with the CU 1214.

The CU 1214 can implement any suitable features of a CU specified in a NR standard. The CU 1214 can perform scrambling ID assignment in accordance with any suitable principles and advantages disclosed herein. The CU 1214 can include physical circuitry programmed to perform scrambling ID assignment. The CU 1214 can include physical circuitry programmed to from RRC messages corresponding to scrambling IDs. The DU 1212 and the CU 1214 can be co-located in certain applications. The DU 1212 and the CU 1214 can be located at different physical locations in some applications. Two or more DUs can be in communication with the radio units 1210 and/or the CU 1214 in some applications.

Various standards and/or protocols may be implemented in the communication environment 1200 to wirelessly communicate data between a radio unit and a UE. Some wireless devices may communicate using an orthogonal frequency-division multiplexing (OFDM) digital modulation scheme via a physical layer. Example standards and protocols for wireless communication in the communication environment 1200 can include the third generation partnership project (3GPP) Long Term Evolution (LTE), Long Term Evolution Advanced (LTE Advanced), 3GPP New Radio (NR) also known as 5G, and the IEEE 802.11 standard, which may be known as Wi-Fi.

A UE of the UEs 1202A to 1202N can include a device used by a user with wireless communication capabilities such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices).

Although features may be disclosed with reference to UEs, any suitable principles and advantages disclosed herein can be implemented with any suitable wireless communication devices. As one example, scrambling ID features can alternatively or additionally be applied to a network device and a network node. For instance, the network device can be an integrated backhaul access (IAB) node and the network node can be an IAB donor.

Figures 13, 14:
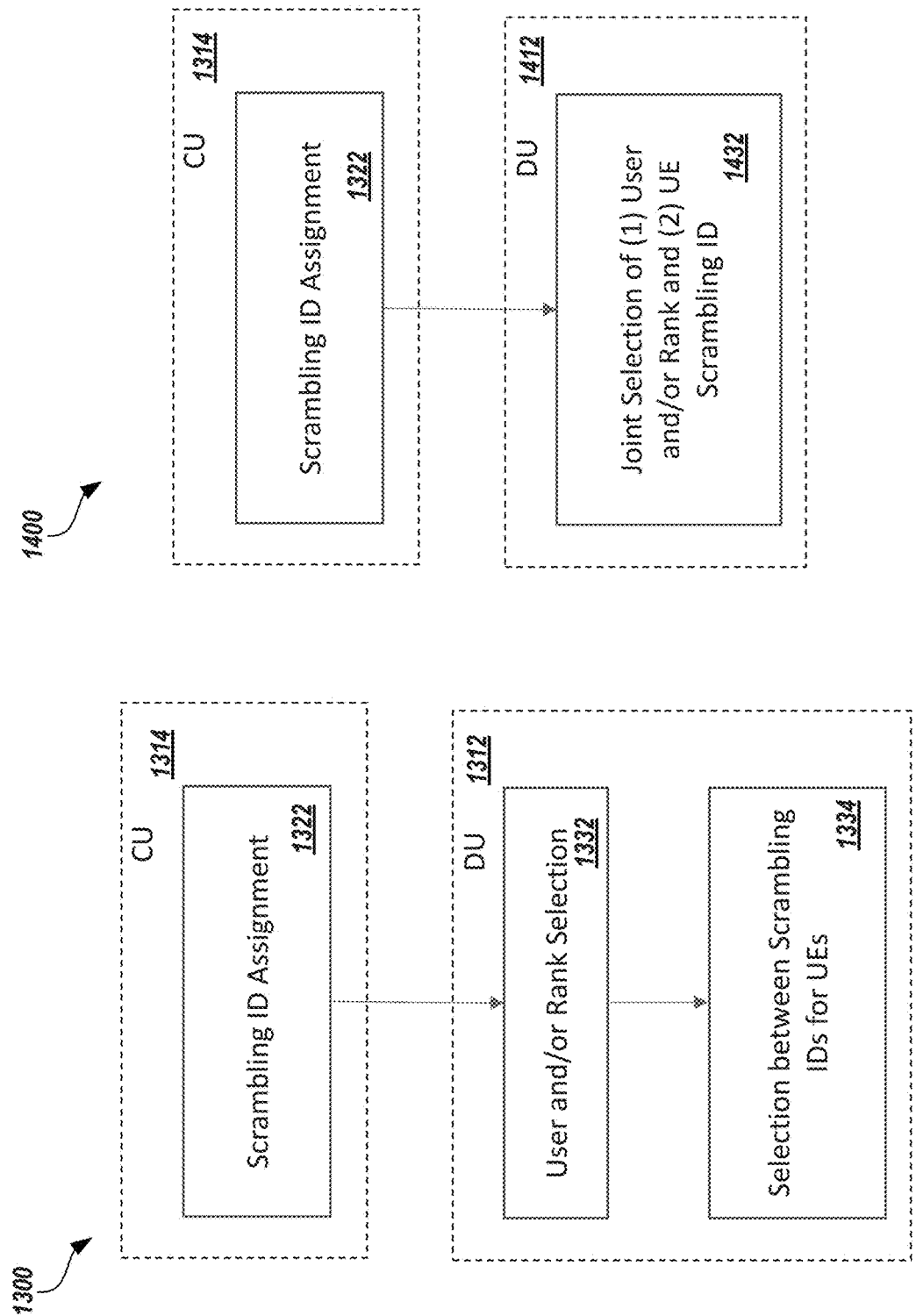
FIG. 13 is a schematic block diagram of a baseband system with a centralized unit (CU) and a distributed unit (DU) according to an embodiment.
FIG. 14 is a schematic block diagram of a baseband system with a CU and a DU according to another embodiment.

FIG. 13 is a schematic block diagram of a baseband system 1300 with a CU 1314 and a DU 1312 according to an embodiment. The baseband system 1300 can be a referred to as a BBU. The CU 1314 includes a scrambling ID assignment block 1322. The scrambling ID assignment block 1322 includes physical hardware programmed to perform scrambling ID assignment functions. The physical hardware can included dedicated circuitry and/or circuitry shared to perform other functions. The scrambling ID assignment block 1322 can assign scrambling IDs to UEs in a RRC configuration in accordance with any suitable principles and advantages disclosed herein. For example, scrambling ID assignment block 1322 can any perform suitable features discussed with reference to blocks 402 to 408 of the method 400 of FIG. 4. As another example, scrambling ID assignment block 1322 can any perform suitable features discussed with reference to blocks 402 to 809 of the method 800 of FIG. 9. As one more example, scrambling ID assignment block 1322 can any perform suitable features discussed with reference to blocks 402 to 1008 of the method 1000 of FIG. 10. ScramblingID0 and ScramblingID1 of an NR standard can be assigned by the scrambling ID assignment block 1322.

The DU 1312 includes a user and/or rank selection block 1332 and a scrambling ID selection block 1334. Each of these blocks of the DU 1312 include physical hardware programmed to perform the functions described with reference to these blocks. The physical hardware can included dedicated circuitry and/or circuitry shared to perform other functions. The user and/or rank selection block 1332 can perform user selection. The user and/or rank selection block 1332 can perform rank selection. The scrambling ID selection block 1334 can perform any suitable features of scrambling ID selection disclosed herein. For example, the scrambling ID selection block 1334 can select one scrambling ID for a particular UE from among the plurality of scrambling IDs assigned to the UE by the scrambling ID assignment block 1322 of the CU 1314.

FIG. 14 is a schematic block diagram of a baseband system 1400 with a CU 1314 and a DU 1412 according to another embodiment. The baseband system 1400 can be a referred to as a BBU. The baseband system 1400 is like the baseband system 1300 of FIG. 13, except the baseband system 1400 includes a DU 1412 with a joint user and/or rank selection and UE scrambling ID selection block 1432. FIG. 14 illustrates that a block of the DU 1412 can perform both user and/or rank selection and scrambling ID selection.

Figure 15:
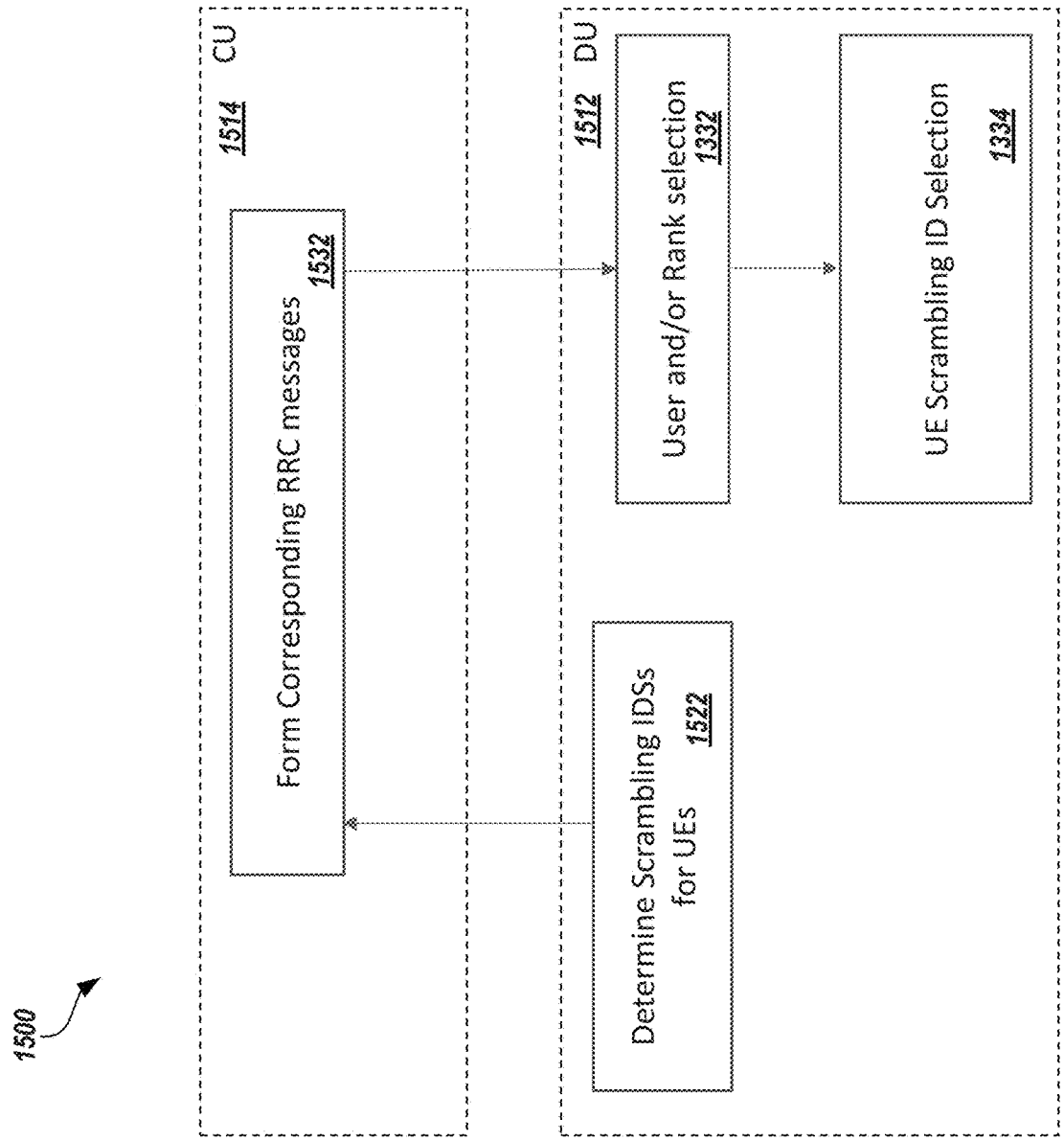
FIG. 15 is a schematic block diagram of a baseband system with a CU and a DU according to another embodiment.

FIG. 15 is a schematic block diagram of a baseband system 1500 with a CU 1514 and a DU 1512 according to another embodiment. The baseband system 1500 can be a referred to as a BBU. The baseband system 1500 is like the baseband system 1300 of FIG. 13, except the baseband system 1500 includes a DU 1512 with scrambling ID determination block 1522 and a CU 1514 with a RRC message block 1532. In the baseband system 1500, the scrambling ID determination block 1522 of the DU 1512 determines scrambling IDs for UEs. Then the RRC message block 1532 of the CU 1514 forms RRC messages corresponding to the scrambling IDs for the UEs. The RRC message block 1532 can configured the scrambling IDs. The DU 1512 can perform user and/or rank selectin with the user and/or rank selection block 1332. An RRC configured scrambling ID can be selected by the scrambling ID selection block 1334 of the DU 1512.

A BBU can include physical circuitry programmed to perform any suitable operations related to one or more of scrambling ID assignment, scrambling ID selection, user and/or rank selection, reference signal generation, causing wireless transmission, or the like disclosed herein. For example, a BBU can be configured to perform DMRS scrambling ID assignment and selection. A BBU can include at least one processor and store instructions that, when executed by the at least one processor, cause any suitable baseband operations disclosed herein to be performed. The instructions can be stored in any suitable non-transitory memory of the BBU. As discussed above, a BBU can include a DU and a CU. Although some embodiments relate to applications with a DU and a CU, any suitable principles and advantages disclosed herein can be applied to other applications with different BBUs.

Figure 16:
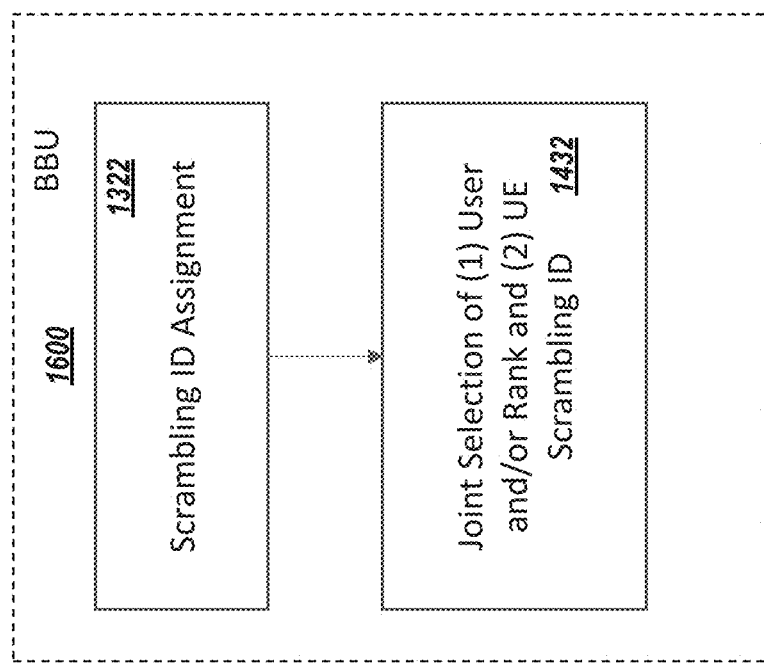
FIG. 16 is a schematic block diagram of a baseband unit (BBU) according to an embodiment.

FIG. 16 is a schematic block diagram of an example BBU 1600 according to an embodiment. The illustrated BBU 1600 includes a scrambling ID assignment block 1322 and a joint user and/or rank selection and UE scrambling ID selection block 1432.

The technical solutions related to scrambling IDs disclosed herein can be implemented with little to no impact on the UE side. In certain applications, implementations of embodiments of scrambling IDs disclosed herein can be transparent to UE operations.

Although embodiments may be discussed with reference to New Radio applications, any suitable principles and advantages disclosed herein can be implemented in Long Term Evolution applications, in applications for technology developed after New Radio, in other suitable wireless communication applications, or any suitable combination thereof.

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially. Any suitable combination of parallel and/or sequential execution of a method disclosed herein can be performed.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires and/or via optical fiber and/or via any other suitable connection.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of assigning scrambling identifiers, the method comprising:
    assigning, by a baseband unit, a first scrambling identifier to each user equipment of a group of user equipments and each user equipment of a second group of user equipments, such that the first scrambling identifier is the same for each of the user equipments of the group and the same for each of the user equipments of the second group, wherein the first scrambling identifier is different for the user equipments of the group than for the user equipments of the second group; and
    assigning, by the baseband unit, a second scrambling identifier to each of the user equipments of the group and each of the user equipments of the second group, such that the second scrambling identifier is different for each of the user equipments of the group and different for each of the user equipments of the second group,
    wherein the user equipments of the group are co-scheduled with the user equipments of the second group.

2. The method of claim 1, further comprising causing transmission of a wireless communication to a particular user equipment of the group, wherein the wireless communication is associated with either the first scrambling identifier or the second scrambling identifier assigned to the particular user equipment.

3. The method of claim 1, further comprising selecting one of the first scrambling identifier or the second scrambling identifier as a selected identifier for a particular user equipment of the group.

4. The method of claim 3, further comprising generating a demodulation reference signal sequence based on the selected identifier.

5. The method of claim 4, further comprising transmitting a wireless transmission to the particular user equipment, wherein the wireless transmission includes a demodulation reference signal associated with the demodulation reference signal sequence, and wherein the wireless transmission is one of a Physical Downlink Shared Channel (PDSCH) transmission or a Physical Uplink Shared Channel (PUSCH) transmission.

6. The method of claim 3, wherein the selecting is based on one or more of (i) whether one or more co-scheduled user equipments belong to the group or (ii) how demodulation reference signals of the one or more co-scheduled user equipments are populated into radio equipments.

7. The method of claim 1, further comprising randomly or pseudo-randomly selecting scrambling identifiers for assigning to the user equipments of the group.

8. The method of claim 1, further comprising selecting scrambling identifiers for assigning to the user equipments of the group based on resulting correlation across demodulation reference signal sequences generated using the scrambling identifiers.

9. The method of claim 1, further comprising dividing a plurality of user equipments in groups, wherein the groups comprise the group and the second group.

10. The method of claim 1, wherein the second scrambling identifier of each of the user equipments of the group is associated with a respective Radio Network Temporary Identifier (RNTI).

11. A method of assigning scrambling identifiers, the method comprising:

selecting a number of user equipments to include in a group based on one or more of a number of user equipments in a system, a number of transmission layers, or a number of supported orthogonal ports for demodulation reference signals;

dividing a plurality of user equipments in groups, wherein the groups comprise the group and a second group;

assigning, by a baseband unit, a first scrambling identifier to each user equipment of the group, such that the first scrambling identifier is the same for each of the user equipments of the group; and assigning, by the baseband unit, a second scrambling identifier to each of the user equipments of the group, such that the second scrambling identifier is different for each of the user equipments of the group.

12. A network system comprising:

a baseband unit comprising at least one processor and storing instructions, wherein the instructions, when executed by the at least one processor, cause the baseband unit to:
assign a first scrambling identifier to each user equipment of a plurality of groups of user equipments and a second scrambling identifier to each of the user equipments of the plurality of groups, such that (i) the first scrambling identifier is the same for each of the user equipments of a first group of the plurality of groups, (ii) the second scrambling identifier is different for each of the user equipments of the first group, (iii) the first scrambling identifier is the same for each of the user equipments of a second group of the plurality of groups (iv) the second scrambling identifier is different for each of the user equipments of the second group, and (v) the first scrambling identifier for each of the user equipments of the second group is different than the first scrambling identifier for each of the user equipments of the first group, wherein the user equipments of the first group are co-scheduled with user equipments of the second group;
select one of the first scrambling identifier or the second scrambling identifier as a selected identifier for a particular user equipment of the first group; and
generate a demodulation reference signal sequence based on the selected identifier; and one or more radio units in communication with the baseband unit, the one or more radio units configured to wirelessly transmit a demodulation reference signal to the particular user equipment of the first group, the demodulation reference signal being associated with the demodulation reference signal sequence.

13. The network system of claim 12, wherein the one or more radio units comprise a plurality of distributed remote radio units.

14. The network system of claim 12, wherein the one or more radio units are configured to wirelessly transmit multiple-input multiple-output communications.

15. The network system of claim 12, wherein the instructions, when executed by the at least one processor, cause the baseband unit to select a number of user equipments to include in the group based on one or more of a number of user equipments in a system, a number of transmission layers, or a number of supported orthogonal ports for demodulation reference signals.

16. A baseband system comprising:
a centralized unit comprising circuitry programmed to:
assign a first scrambling identifier to each user equipment of a group of user equipments and a second scrambling identifier to each of the user equipments of the group, such that (i) the first scrambling identifier is the same for each of the user equipments of the group and (ii) the second scrambling identifier is different for each of the user equipments of the group; and
assign a first scrambling identifier to each user equipment of a second group of user equipments and a second scrambling identifier to each of the user equipments of the second group, such that (i) the first scrambling identifier is the same for each of the user equipments of the second group, (ii) the second scrambling identifier is different for each of the user equipments of the second group, and (iii) the first scrambling identifier for each of the user equipments of the second group is different than the first scrambling identifier for each of the user equipments of the group; and
a distributed unit in communication with the centralized unit, the distributed unit comprising circuitry programmed to select a particular scrambling identifier for each of the user equipments of the group,
wherein the user equipments of the group are co-scheduled with user equipments of the second group.

17. The baseband system of claim 16, wherein the distributed unit is configured to generate a demodulation reference signal sequence for a particular user equipment of the group based on the selected particular scrambling identifier of the particular user equipment.

18. The baseband system of claim 17, wherein the distributed unit is configured to cause wireless transmission of a Physical Downlink Shared Channel (PDSCH) transmission to the particular user equipment, wherein the PDSCH transmission includes a demodulation reference signal associated with the demodulation reference signal sequence.

19. The baseband system of claim 17, wherein the distributed unit is configured to cause wireless transmission of a Physical Uplink Shared Channel (PUSCH) transmission to the particular user equipment, wherein the PUSCH transmission includes a demodulation reference signal associated with the demodulation reference signal sequence.

20. The baseband system of claim 16, wherein
the centralized unit is configured to divide a plurality of user equipments in groups, wherein the groups comprise the group and the second group.

21. The baseband system of claim 16, wherein the centralized unit is configured to select a number of user equipments to include in the group based on one or more of a number of user equipments in a system, a number of transmission layers, or a number of supported orthogonal ports for demodulation reference signals.

* * * * *